Figure 2:
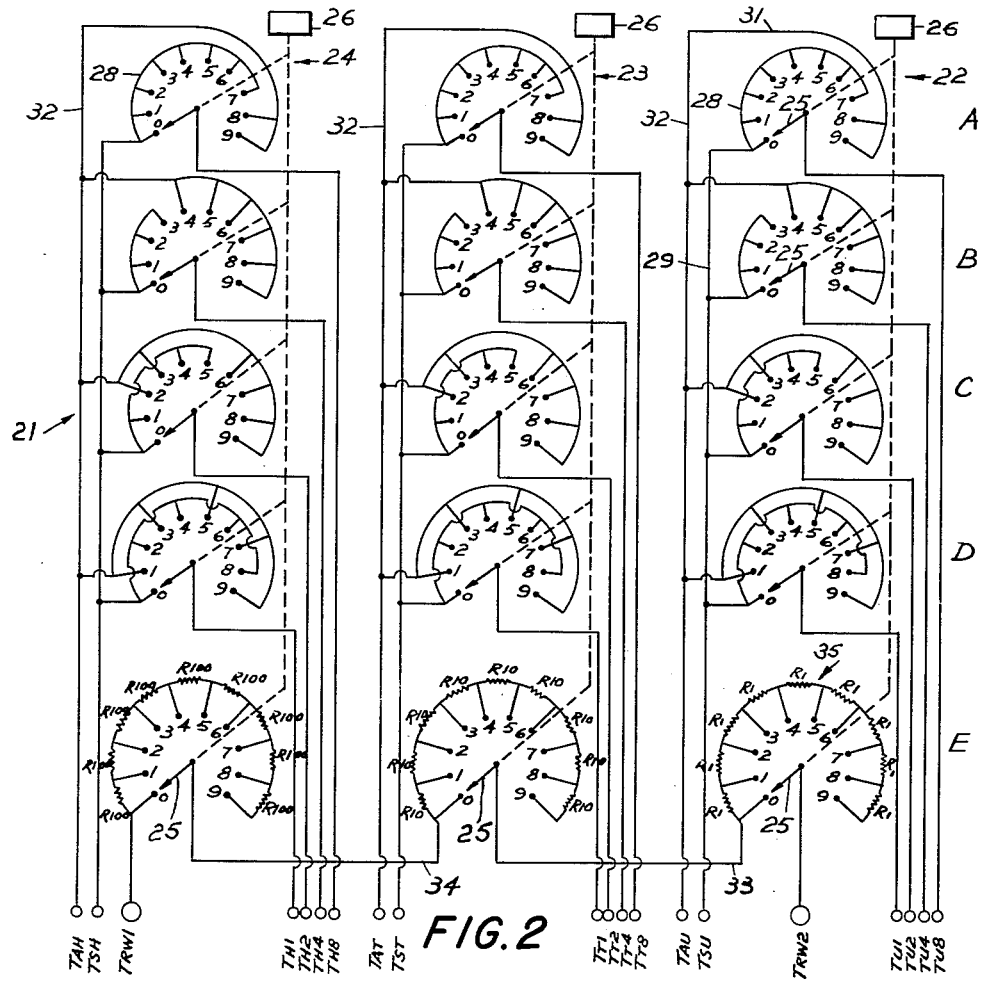

June 6, 1961  E. KOLISCH  2,987,254
EQUIPMENT FOR PLANNING THE LOADING OF CARGO AIRCRAFT
Filed Aug. 20, 1957  9 Sheets-Sheet 1
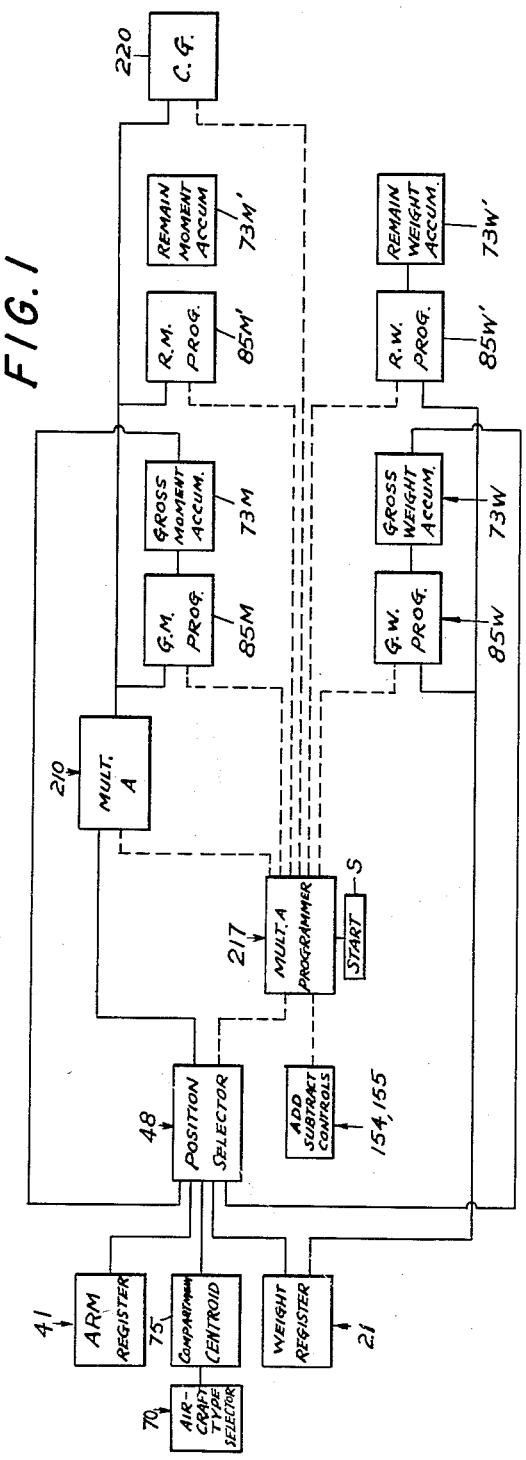
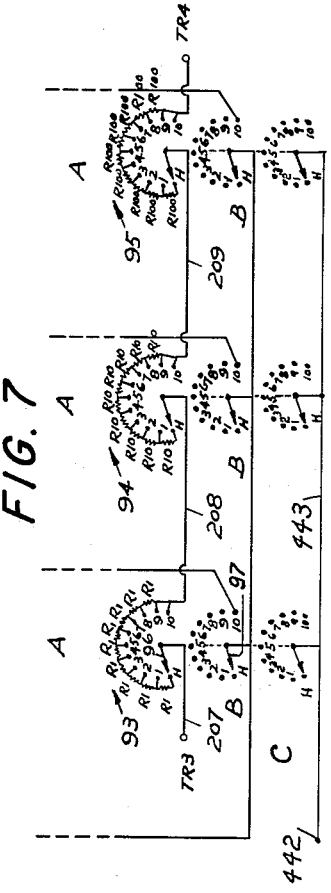
INVENTOR.
EMIL KOLISCH
BY
Dean Fairbank & Hirsch
ATTORNEYS.

June 6, 1961 E. KOLISCH 2,987,254
EQUIPMENT FOR PLANNING THE LOADING OF CARGO AIRCRAFT
Filed Aug. 20, 1957 9 Sheets-Sheet 2

INVENTOR.
EMIL KOLISCH
BY
Dean Fairbank + Hirsch
ATTORNEYS.

June 6, 1961   E. KOLISCH   2,987,254
EQUIPMENT FOR PLANNING THE LOADING OF CARGO AIRCRAFT
Filed Aug. 20, 1957   9 Sheets-Sheet 5

INVENTOR.
EMIL KOLISCH
BY
Dean Fairbank + Hiesel
ATTORNEYS.

June 6, 1961    E. KOLISCH    2,987,254
EQUIPMENT FOR PLANNING THE LOADING OF CARGO AIRCRAFT
Filed Aug. 20, 1957    9 Sheets-Sheet 6

INVENTOR.
EMIL KOLISCH
BY
Dean Fairbank & Hirsch
ATTORNEYS.

June 6, 1961 E. KOLISCH 2,987,254
EQUIPMENT FOR PLANNING THE LOADING OF CARGO AIRCRAFT
Filed Aug. 20, 1957 9 Sheets-Sheet 7

FIG. 9

INVENTOR.
EMIL KOLISCH
BY
Dean Fairbank + Hirsch
ATTORNEYS.

INVENTOR.
EMIL KOLISCH

ATTORNEYS.

INVENTOR.
EMIL KOLISCH
BY
Dean Fairbank + Hirsch
ATTORNEYS.

United States Patent Office 2,987,254
Patented June 6, 1961

2,987,254
EQUIPMENT FOR PLANNING THE LOADING
OF CARGO AIRCRAFT
Emil Kolisch, New York, N.Y., assignor to Continental
Electrolog Corp., a corporation of New York
Filed Aug. 20, 1957, Ser. No. 679,174
16 Claims. (Cl. 235—179)

In order for an aircraft to take off, fly and land safely, the distance of its center of gravity along the length of the aircraft from a fixed reference datum, must be at a position somewhere between certain definite fixed limits which are generally determined by the manufacturer of the aircraft.

The unloaded weight of an aircraft, i.e., without crew, fuel, extra equipment or cargo, but including all standard equipment, is determined generally by actually weighing the aircraft on a suitable weighing kit. The center of gravity position of the unloaded aircraft is determined generally by utilizing suitable formulas in which the unloaded weight is a factor.

Assuming that the aircraft is to travel to a predetermined destination requiring a given fuel load, the weight of which is readily ascertainable, a specialist in the weights and balances division of the airport, taking into consideration the weight and center of gravity position of the unloaded aircraft, as well as the weight of the crew, fuel and extra equipment and the location of such items, may determine by means of standard calculating devices well known in the art, the primary operating weight and primary operating center of gravity position of the aircraft, i.e., the weight and center of gravity position of the aircraft loaded with all but cargo.

The payload or weight of cargo that can be carried by the aircraft is of course the permissible gross take-off weight less the primary operating weight.

According to one present loading practice, the cargo loading supervisor attempts to distribute the available cargo load through the compartments or regions of the aircraft, so that the final center of gravity position of the aircraft fully loaded with the available cargo, will fall within the permissible limits of the center of gravity.

As the loading proceeds, according to present loading practice, the weights of the successive items of cargo, generally indicated on each item by the shipper or manufacturer, and their position in the aircraft are noted on the manifest. After the aircraft has been loaded, the manifest is turned over to the weights and balances division of the airport which determines the final or take-off center of gravity position of the aircraft as thus loaded. Should the final center of gravity position thus determined be outside of the permissible limits of the center of gravity, the cargo loading supervisor will be advised that the cargo is improperly loaded and must be shifted.

As the distribution of the cargo load requires estimation, computations and reference to charts, some shifting of cargo may be required, however skilled the cargo loading supervisor, in order to correct inevitable errors in loading. This is a very time-consuming and arduous procedure by reason of the difficulty of manipulating heavy and bulky items of cargo within the limited confines of the aircraft. In addition, each time the cargo is shifted, new calculations must be made to check for correctness of the new distribution.

As a result of the foregoing, the take-off of the aircraft will be delayed with consequent loss of efficiency due to reduction of flying time with consequent piling up of cargo in the warehouse.

Where the final or take-off center of gravity position of the aircraft is determined by means of a specially designed slide rule, or computed by the use of a standard calculating machine, to which the data from the manifest is transferred, the many manipulations required in the use of such units are time-consuming. The calculations must accordingly be carefully checked and re-checked for errors and even with such checking and re-checking, there is no assurance that some error has not remained undetected.

Where, in the attempt to eliminate the need for shifting of cargo, planning of the cargo distribution is done before loading and such planning involves the use of a slide rule or calculating machine, the problems above noted render such planning operation time-consuming and subject to error and such difficulties are aggravated when problems of airdrops, off-loading and on-loading must be considered.

Where, after the aircraft is loaded and the center of gravity position is determined to be within safe limits by resort to the slide rule or calculating machine, as above pointed out, additional cargo must be loaded into the aircraft, the new center of gravity position must then be determined in the same manner as previously described with resultant delay in the take-off of the aircraft and without assurance that error does not remain.

It is accordingly among the objects of the invention to provide an automatic computing equipment which is universally applicable by resort to simple manipulation, for use with any of various models, sizes and specification of aircraft, which may readily and expeditiously be operated to solve numerous problems including the determination of the distribution of a given cargo load for a desired or take-off final center of gravity position,[1] the checking of such planned loading of an aircraft to confirm that its center of gravity position falls within desired limits, the re-checking of the loaded aircraft in the event further cargo is to be added, and the determination of the effects on the center of gravity position of airdrops, off-loading, on-loading and the like, all without the need for calculations of any sort, or the consultation of charts.

According to the invention from a broader aspect, the equipment has facilities whereby there may be manually set into the computations a desired sequence of compartments (not necessarily adjoining) through which the cargo weight is to be distributed, whereupon the equipment automatically determines a distribution of the cargo weight through the compartments of the sequence in such manner that the moment of the cargo to be loaded according to such distribution when added to the primary operating moment of the aircraft (moment of the aircraft loaded with all but cargo) will equal the desired gross moment of the aircraft, which is the product of the desired take-off center of gravity position and the gross take-off weight of the aircraft, to attain substantially the desired final center of gravity position.

More specifically, the equipment determines the portion of the cargo weight to be loaded into the first compartment of a selected sequence of compartments having a predetermined load distribution pattern, so that after such portion is loaded, the ratio of the then remaining cargo moment divided by the remaining cargo weight is substantially equal to the ratio of the sum of the moments of the selected weight distribution pattern for the remaining compartments in the sequence divided by the

---

[1] Illustratively, the nose of the aircraft is taken as the reference datum for the position of center of gravity and for length of moment arms, i.e., distance to centroids of compartments, in all illustrations that follow.

sum of the selected weights for such compartments. This can be expressed by the formula:

(I) $$\frac{RM-MF}{RW-WF} = \frac{\Sigma M - F}{\Sigma W - F}$$

where $RM$ = remaining moment
$RW$ = remaining weight.
$MF$ = moment of weight loaded into first compartment
$WF$ = weight loaded into first compartment
$\Sigma M - F$ = sum of moments of all compartments except first compartment
$\Sigma W - F$ = sum of weights of all compartments except first compartment Thus, distribution of the cargo weight in all of the selected sequence of compartments is to be effected proportionally according to the selected load distribution pattern substantially to attain the desired center of gravity position.

According to a feature of the invention, the equipment compares the ratio $(S\Sigma - F)$ of the sum of the moments of all of the compartments in the selected sequence less the first compartment divided by the sum of the weights of such compartments, to the ratio (SL) of the then remaining cargo moment divided by the then remaining cargo weight.

If $SL = S\Sigma - F$, it would mean, referring to Formula I, that zero weight would have to be loaded into the first compartment to satisfy the formula. If $SL < S\Sigma - F$, it would mean, referring to Formula I, that a finite weight could be loaded into the first compartment, and the equipment modifies the proportional load distribution for the compartment for which the load is being planned so that after such modified proportional load is set into the equipment for the initial compartment or compartments of the sequence to be loaded, thereafter the ratio of the then remaining moment to the then remaining weight will substantially equal the ratio of the sum of the moments of the selected weight distribution pattern for the compartments of the selected sequence less the initial compartment or compartments, to the sum of the selected weight distribution pattern for such compartments, thereby to effect proportional distribution of the then remaining cargo weight to substantially achieve the desired final center of gravity position of the aircraft.

If $SL > S\Sigma - F$, referring to the Formula I, it would mean that the final moment of the aircraft, if any load was placed in the first compartment, and if all the compartments in the selected sequence are used, would be less than that desired, if proportional loading was followed. If proportional loading was not followed, then some of the compartments would have very little weight load which might cause unequal bending stress along the length of the aircraft which is undesirable.

If $SL > S\Sigma - F$, the first compartment in the selected sequent is eliminated from the computations and the equipment will thereupon automatically recompute $S\Sigma - F$ based on the remaining compartments in the sequence and this procedure is thus repeated until $SL =$ or $< S\Sigma - F$ for the remaining compartments in the selected sequence.

If $SL < S\Sigma - F$, the modified proportional load for the first compartment of the sequence will permit proportional distribution of the remaining load into the remaining compartments of the sequence for desired final center of gravity. However, it is possible under such condition that a very heavy load may be placed into the first compartment and relatively light loads into the remaining compartments. This is undesirable as mechanical stresses along the length of the aircraft may not be evenly distributed.

According to another feature of the invention, the equipment has means to prevent an extreme deviation between a modified proportional load greater than proportional in the first compartment and the proportional loads in the remaining compartments.

It is to be noted that if the last compartment in the sequence should be eliminated, as a relatively small weight would have a relatively great moment due to the arm of such last compartment, then the weight in the first compartment would have to be reduced and distributed into compartments more remote from the reference datum to make up the moment lost by elimination of the last compartment. Hence, the proportional weight distribution between the first compartment and the remaining compartments might not be as extreme as if the last compartment remained. Accordingly, the equipment compares SL to the ratio $[S(\Sigma - L)]$ of the sum of the moments of the selected pattern of the compartments in the sequence less the last compartment, to the sum of the selected weights of such compartments. If $SL = > S(\Sigma - L)$, the equipment will modify the proportional load distribution for the first compartment as set forth above. However, if $SL < S(\Sigma - L)$, the equipment indicates that the last compartment of the sequence should be eliminated from the computations thereafter and automatically recomputes the new $S\Sigma - L$.

According to another feature, the equipment has facilities for changing the load distribution pattern so that, for example, based upon the nature of the cargo to be loaded or the weight of the cargo, the portion of the cargo weight to be distributed in any compartment may be a predetermined proportion of the entire cargo weight.

The equipment also has facilities for determining whether the total cargo weight can be loaded into the selected compartments of the sequence without exceeding their total capacity and whether the planned load for a compartment exceeds the weight capacity of such compartment and if so for indicating such weight capacity.

More specifically, facilities are provided for setting into the computation of the equipment:

(a) The primary weight of the aircraft (which for purposes of illustration will be assumed to include the weight of the unloaded aircraft with its standard equipment plus weight of crew, fuel and extra equipment, but without cargo);

(b) The primary center of gravity position of the aircraft;

(c) The position of the desired final center of gravity;

(d) The cargo weight to be carried;

(e) The planned weight and preload weight to be loaded into the respective compartments and preload stations of the aircraft; and (f) A fixed position in each of the compartments and a desired position for preload stations (illustratively the centroid of the respective compartments and preload stations).

The equipment has means to determine automatically:

(a) The desired gross moment of the aircraft as the product of the desired final center of gravity position and the gross weight (the sum of the primary weight and cargo weight);

(b) The moment of the planned load for each compartment and preload for each station as the product of the planned load or preload and the centroid position of the associated compartment or station;

(c) The primary moment of the aircraft as the product of the primary weight and primary center of gravity position;

(d) The remaining moment, i.e., the difference between the desired gross moment and the sum of the primary moment, and the accumulated preload and cargo moments thus far planned;

(e) The remaining weight, i.e., the difference between the cargo weight and the sum of the preload weights and those thus far planned for the respective compartments;

(f) The accumulated weights of primary weight plus preload weights and cargo weights planned, i.e., gross weight;

(g) The accumulated moments of primary weight plus preload weight and cargo weights planned, i.e., gross moment; and (h) Center of gravity position based on (f) and (g).

More particularly, the primary weight of the aircraft (weight of the aircraft loaded with all but cargo) and the corresponding primary center of gravity position are set into the equipment and the primary moment is determined. In addition, the cargo weight to be carried and the desired final center of gravity position are also set into the equipment.

The equipment will thereupon automatically compute the desired gross moment of the aircraft, i.e., the product of the desired final center of gravity position and desired gross weight of the aircraft (the sum of the primary weight and the cargo weight).

Thereupon, the equipment will automatically determine the remaining weight to be loaded into the aircraft, which is equal to the cargo weight less any preload and the amount (if any) of cargo weight thus far planned for loading. At the start of the load planning such remaining weight is thus equal to the cargo weight less the weight of any preload set into the equipment and decreases as planned loads are set into the equipment.

In addition, the equipment will determine the remaining moment corresponding to such remaining weight, which is equal to the gross moment less the sum of the primary moment, and the moments of any preload and of the weight thus far planned for loading, all of which moments are computed by the equipment. At the start of the load planning, such remaining moment is thus equal to the cargo moment less any preload moment and decreases as planned loads are set into the equipment.

It is apparent that if the cargo weight is distributed through the compartments of the aircraft so that the sum of the moments of such cargo weight when added to the sum of the primary moment, and preload moment, equals the gross moment, the desired final conditions of gross weight and gross moment will be achieved and hence the aircraft will have the desired final center of gravity position.

Assuming that the aircraft has "$n$" compartments to be loaded and there are preloads, then the entire cargo weight, including preloads, must be so distributed through said "$n$" compartments, that the resultant sum of the cargo moments, based illustratively upon the centroids of the respective compartments and the centroids of the preloads, plus the primary moment, equals the desired gross moment.

In order to determine the distribution of cargo weight into the aircraft, the weight to be loaded into the first compartment of the sequence is computed to be of such value that after it is loaded, the ratio of the then remaining moment to the then remaining weight will equal the ratio of the sum of the moments of the remaining compartments divided by the sum of the weights of such compartments, i.e., (1) $$\frac{RM - MF}{RW - WF} = \frac{\Sigma M - F}{\Sigma W - F}$$

When this equality is achieved, then if the remaining cargo weight, i.e., the cargo weight less the weight planned for the first compartment, is distributed through the remaining compartments of the aircraft in the same proportion as the selected given weights for such compartments, the cargo weight as thus distributed for the entire aircraft will have a moment equal to the remaining moment and hence the desired final center of gravity position of the loaded aircraft will be obtained.

Assuming that (a) $MF$ = moment of weight to be loaded into first compartment (b) $WF = CL$ (computed load) = weight to be loaded into first compartment (c) $$\frac{\Sigma M - F}{\Sigma W - F} = S\Sigma - F$$

(d) $MF = CL \times SC_F$ (centroid of first compartment)

(e) $RM = RW \times SL$ (ratio of moment to weight of remaining load)

Solving Formula I we find:

(2) $$\frac{RM - MF}{RW - CL} = S\Sigma - F$$

(3) $RM - MF = (S\Sigma - F)RW - (S\Sigma - F)CL$

Substituting for RM and MF we find:

(4) $RW \times SL - CL \times SC_F = (S\Sigma - F)RW - (S\Sigma - F)CL$ (5) $CL[(S\Sigma - F) - SC_F] = RW[(S\Sigma - F) - SL]$ (6) $$CL = RW \frac{(S\Sigma - F) - SL}{(S\Sigma - F) - SC_F}$$

(7) $$CL = RW \frac{\left(\frac{M\Sigma - F}{W\Sigma - F}\right) - \frac{RM}{RW}}{\left(\frac{M\Sigma - F}{W\Sigma - F}\right) - \frac{MF}{WF}}$$

(8) $$CL = \frac{\left(\frac{M\Sigma - F}{W\Sigma - F}\right)RW - RM}{\left(\frac{M\Sigma - F}{W\Sigma - F}\right) - \frac{MF}{WF}}$$

multiply by $$\frac{WF}{WF}$$

we have (9) $$CL = \frac{\left(\frac{M\Sigma - F}{W\Sigma - F}\right)RW - RM}{\left(\frac{M\Sigma - F}{W\Sigma - F}\right)WF - MF}$$

Let $$\left(\frac{M\Sigma - F}{W\Sigma - F}\right)RW - RM = \Delta R$$

and $$\left(\frac{M\Sigma - F}{W\Sigma - F}\right)WF - MF = \Delta B$$

then

(10) $$CL = WF \frac{\Delta R}{\Delta B}$$

To illustrate a typical problem, assume that the primary operating weight of the aircraft (weight of aircraft loaded with all but cargo) is 22,700 pounds; the primary center of gravity is 200 inches; the cargo weight is 9,300 pounds including a preload of 1,000 pounds at centroid 380 inches and the desired final center of gravity position is 240 inches.

The illustrative aircraft has six compartments, B, C, D, E, F and G with a selected given weight distribution (say the maximum weight capacity) of 2,000, 5,000, 5,000 4,000, 3,000 and 1,000 pounds respectively, with the centroids of the compartments 200, 300, 350, 400, 480 and 530 inches respectively.

The primary moment will thus be 4,540,000 inch pounds and the desired gross moment will be 7,680,000 inch pounds leaving a remaining moment of 3,140,000 inch pounds to be satisfied by the distribution of cargo.

Loading the preload weight of 1,000 pounds at centroid 380 inches will result in a preload moment of 380,000 pounds. Hence, the new remaining moment will be 2,760,000 inch pounds and the new remaining weight will be 8300. As the preload occupies compartment D in the illustrative example, the remaining cargo weight of 8300 pounds is to be distributed through some or all of compartments B, C, E, F and G.

The equipment determines which of such remaining compartments should be loaded for most uniform load distribution as previously set forth and in the example herein described, to illustrate the invention, the equipment determines that compartment G should not be loaded.

Accordingly, the weight of 8300 is to be distributed through compartments B, C, E, F.

Before computing the actual load distribution for the compartments, i.e., compartment B, for example, the equipment determines whether the weight to be computed would exceed the maximum capacity of such compartment.

To this end, since CL or the computed weight for the compartment equals $$WF\frac{\Delta R}{\Delta B}$$

it is apparent that if $$\frac{\Delta R}{\Delta B}$$

is greater than one, the product of $$WF\frac{\Delta R}{\Delta B}$$

where WF equals the maximum capacity of the compartment, would exceed such maximum capacity. In the illustrative example, this is found to be the case and the equipment automatically indicates such maximum capacity, i.e., 2,000 pounds as the weight to be loaded into compartment B.

Thereafter the equipments determining the weight (CL) for compartment C, based upon a remaining cargo weight of 6,300 pounds and a remaining cargo moment of 2,360,-000 inch pounds.

Applying Formula 10 to compute the load for compartments C and E, we find CL to equal 2,800 and 2,000 respectively.

Since compartment F is the last compartment of the sequence to be loaded, the equipment automatically indicates the now remaining weight of 1,500 pounds to be loaded into this compartment which in the illustrative example will provide the desired final center of gravity.

This application is a continuation-in-part of copending application Serial No. 524,134, filed July 25, 1955, now Patent No. 2,901,171.

Figure 3:
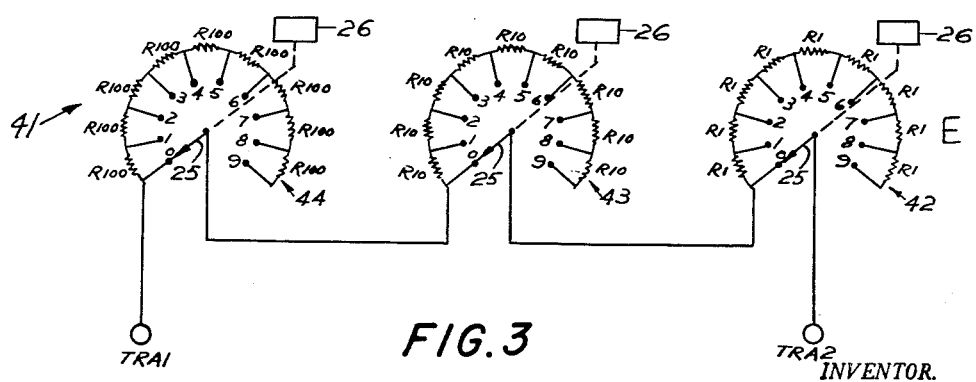
Figure 4:
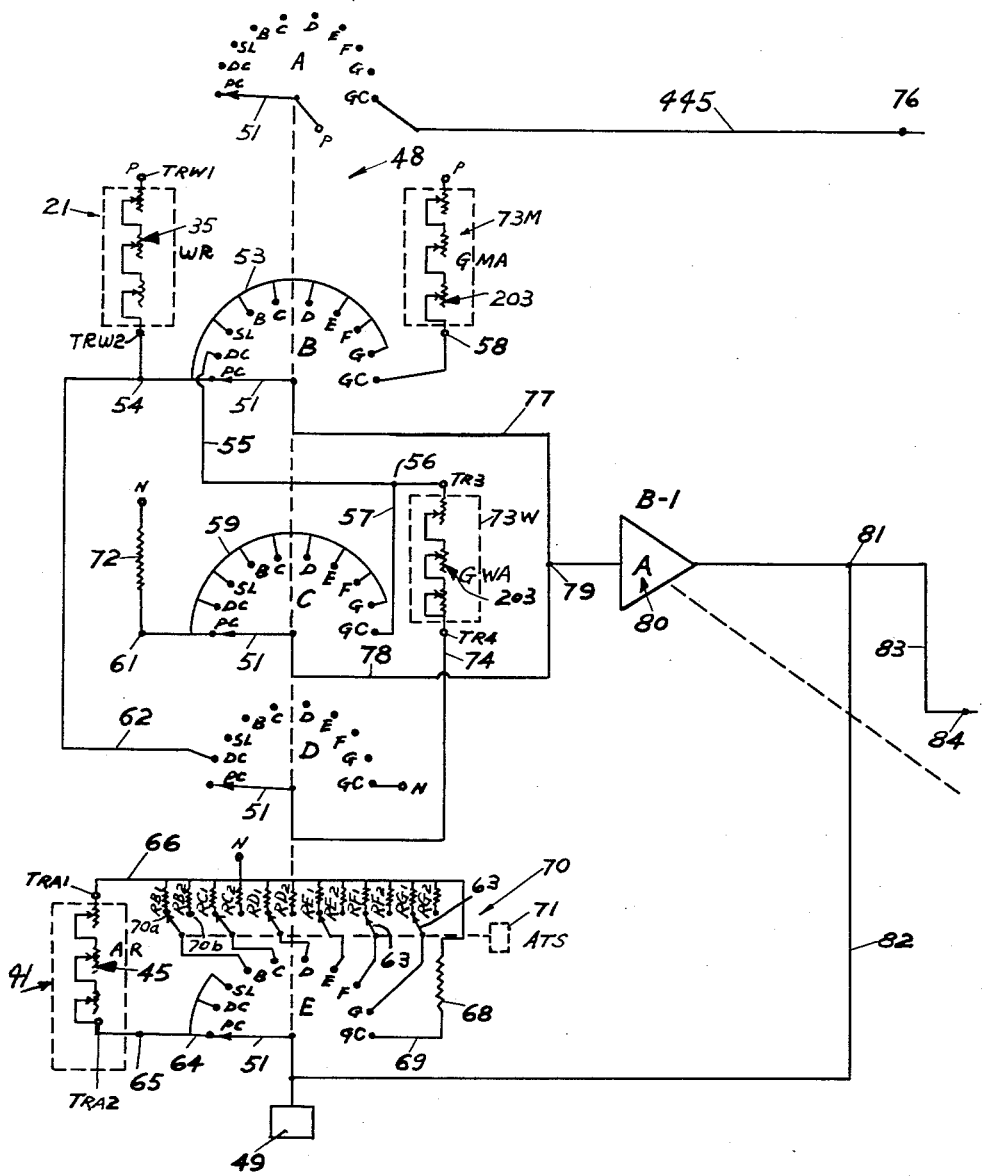
Figure 5:
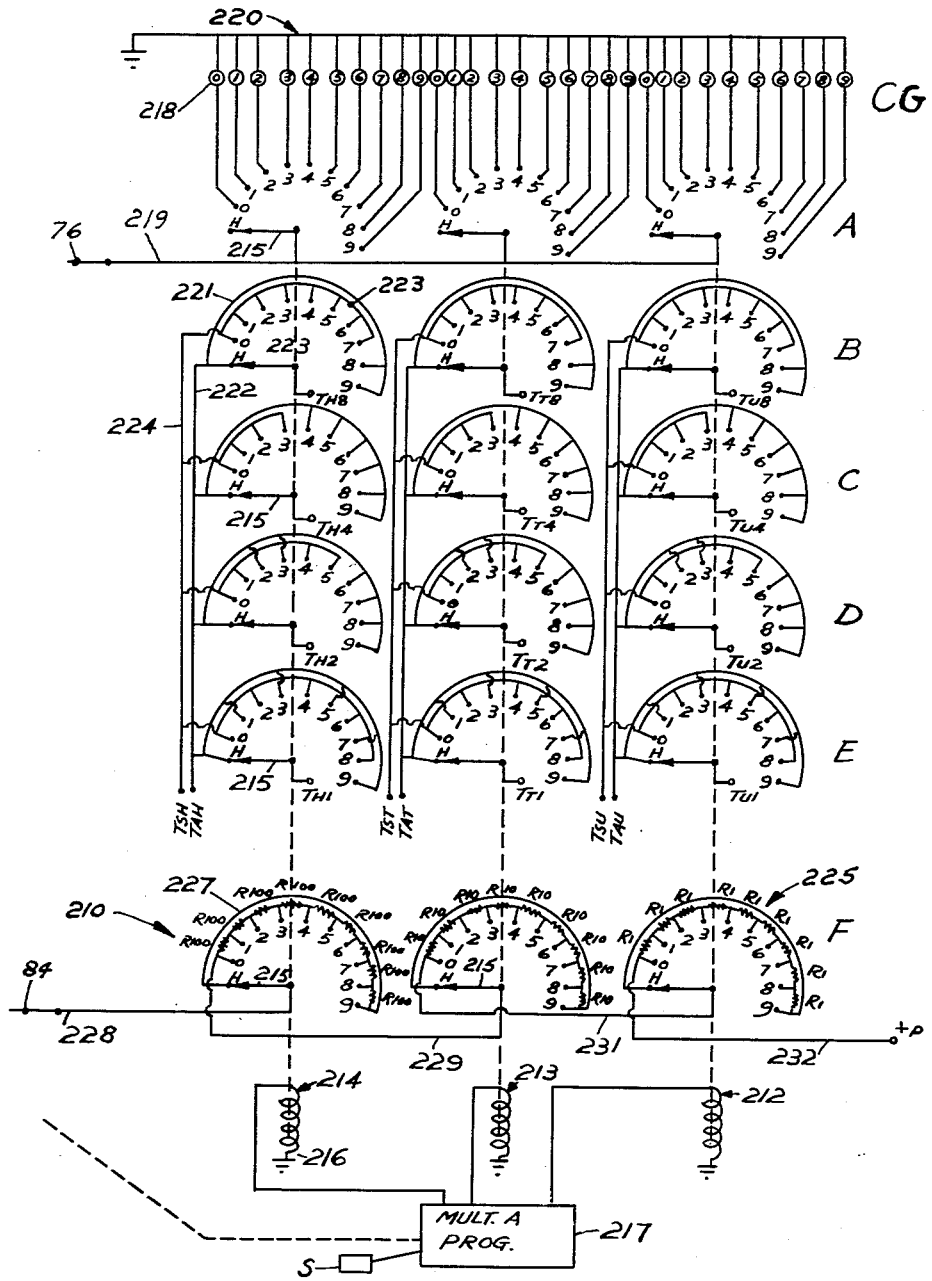
Figure 6:
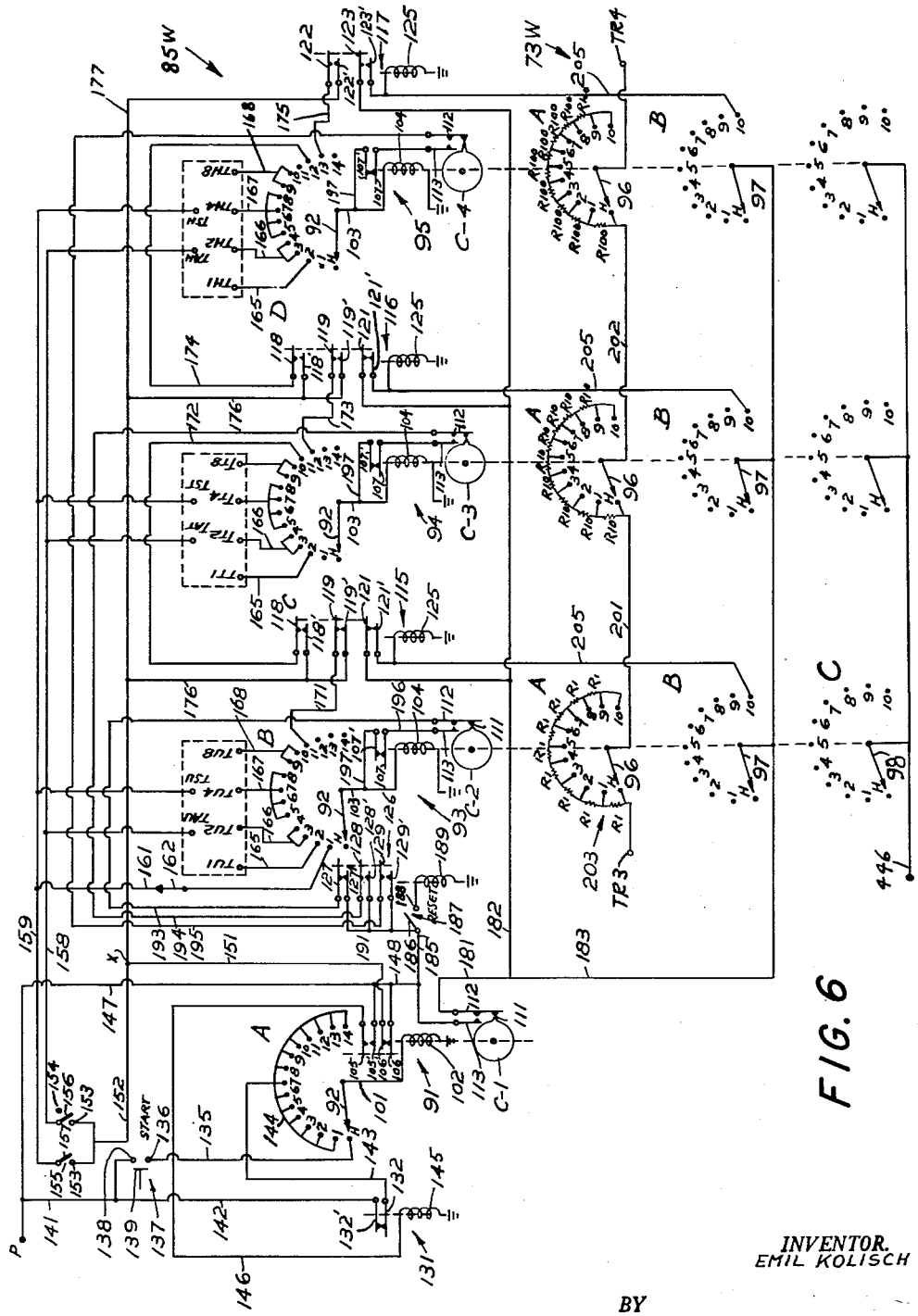
Figure 12:
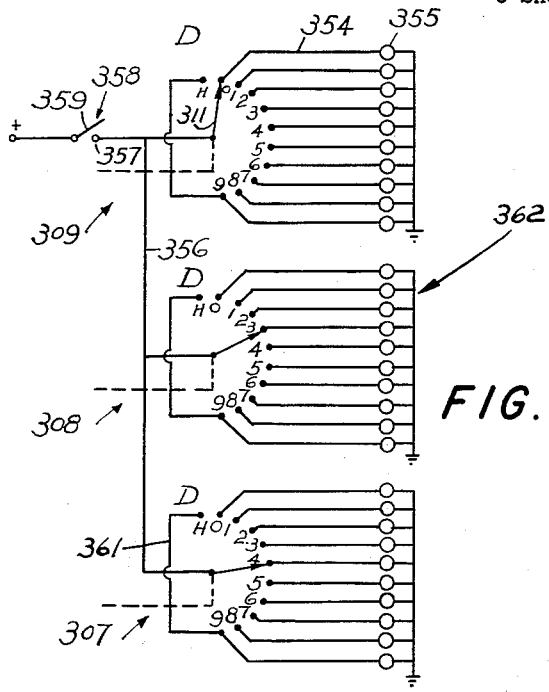
Figure 8:
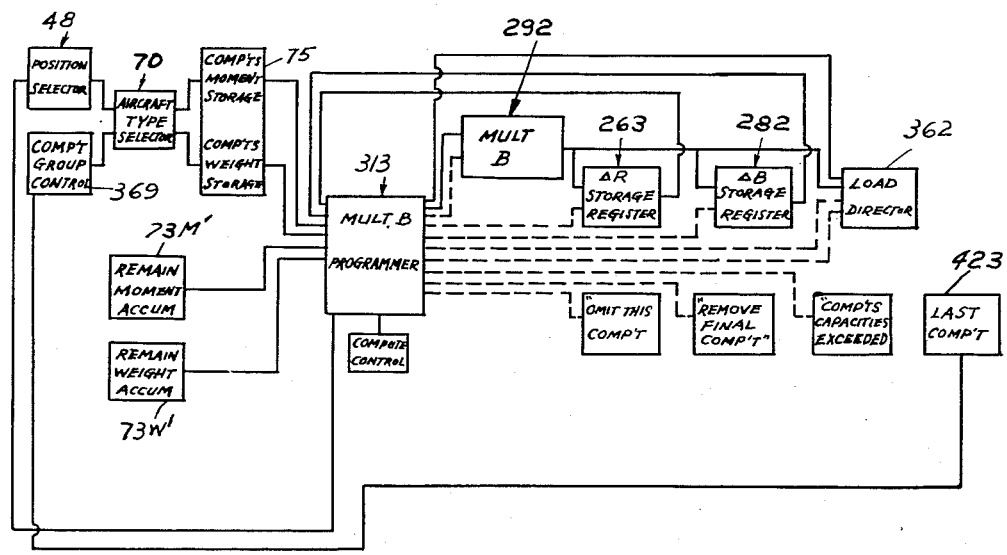
Figure 8A:
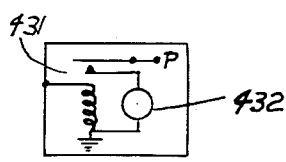
Figure 10:
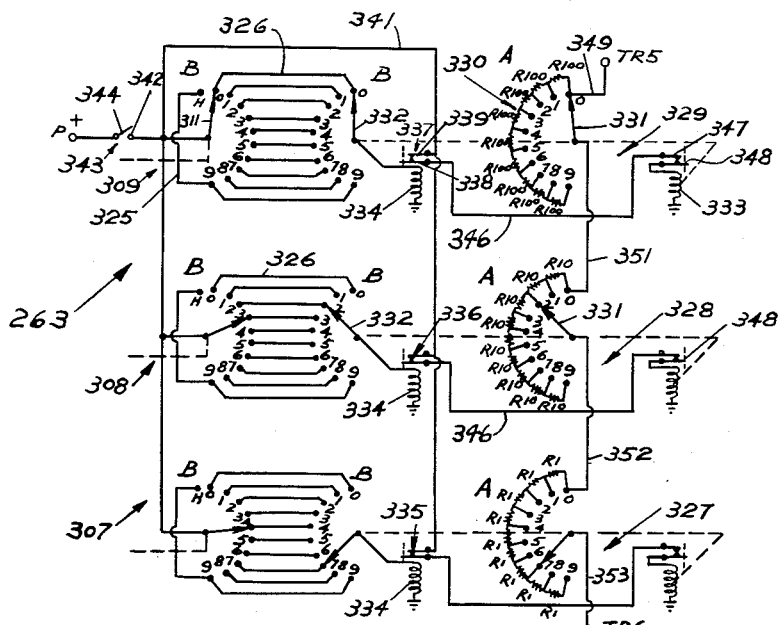
Figure 11:
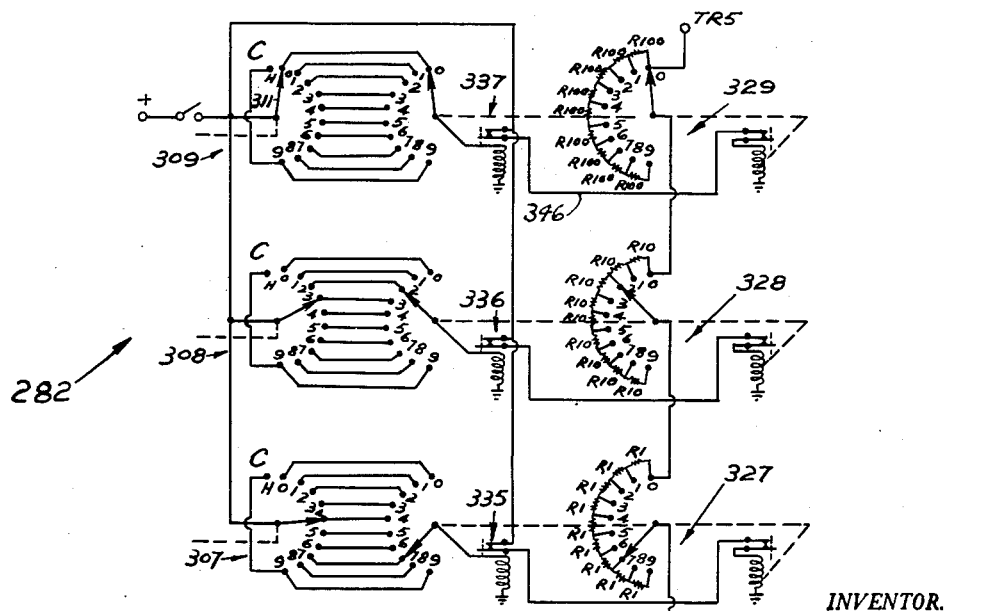
Figure 13:
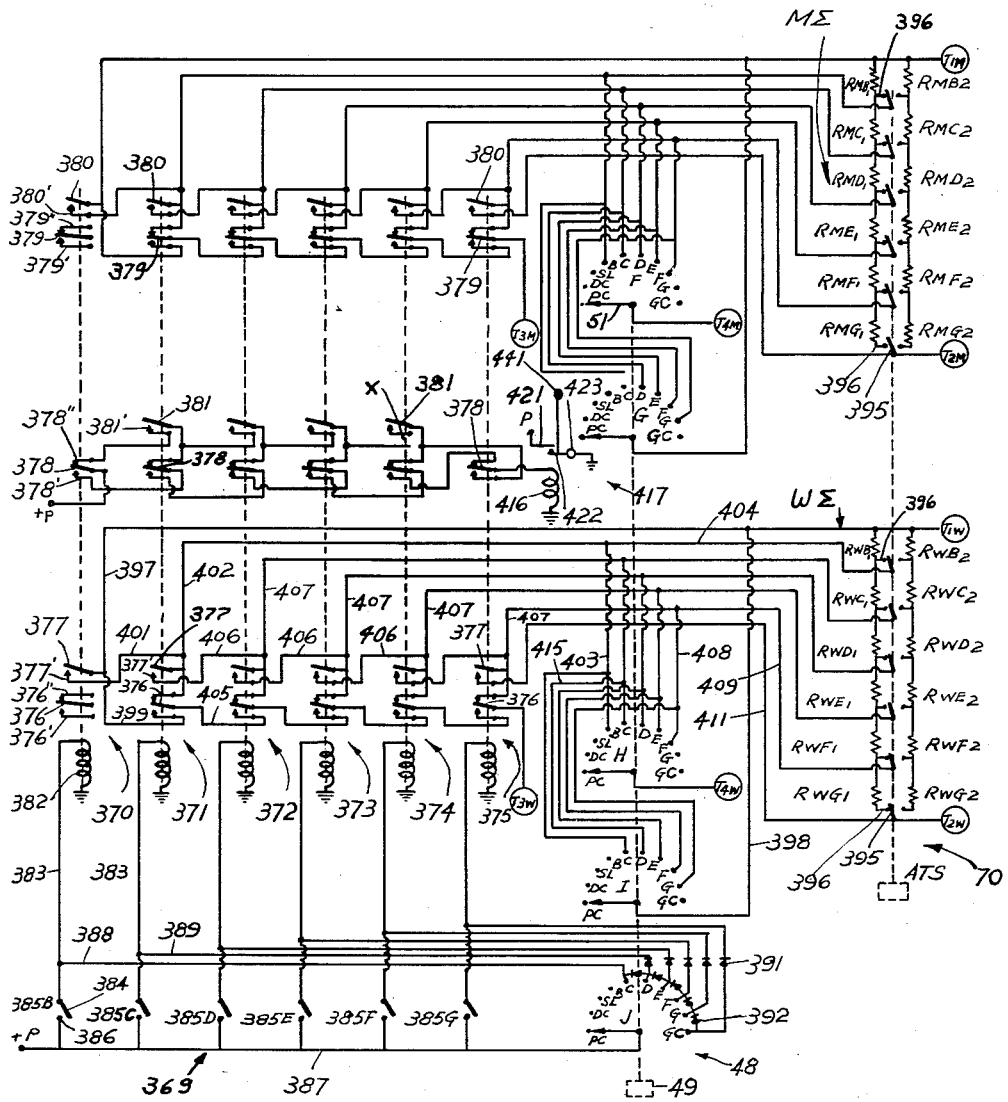
Figure 14:
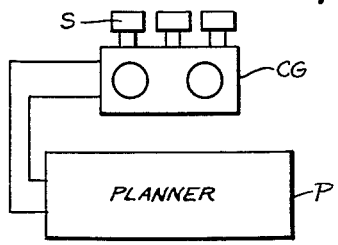

In the accompanying drawings in which are shown one or more of various possible embodiments of the several features of the invention, FIG. 1 is a block diagram of the primary and desired condition circuit, FIG. 2 is a diagrammatic view of the weight register, FIG. 3 is a view of the arm register circuit, FIGS. 4 and 5 are diagrammatic views of one of the bridge circuits for computing primary and desired condition information, FIG. 6 is a diagrammatic view of a typical programmer and accumulator, FIG. 7 is a detail view of a portion of the remaining weight or remaining moment accumulator, FIG. 8 is a block diagram of the load determination circuit, FIG. 8a is a detail view of the relay circuitry for the warning indicators, FIG. 9 is a diagrammatic view of the other bridge circuit for determining the load distribution, FIG. 10 is a diagrammatic view of the $\Delta R$ storage register, FIG. 11 is a diagrammatic view of the $\Delta B$ storage register, FIG. 12 is a diagrammatic view of the load director indicator, FIG. 13 is a diagrammatic view of the compartment selector circuit, and FIG. 14 is a block diagram illustrating an application of the equipment shown in FIGS. 1 to 13.

WEIGHT REGISTER (FIGS. 1 AND 2)

Referring now to the drawings, the equipment comprises a weight register 21 which, as shown in FIG. 2, illustratively comprises three manually operated switches 22, 23 and 24 related to units, tens and hundreds respectively.

Each of the switches has five banks A, B, C, D and E, each with ten fixed contacts, designated 0 and 1 through 9 respectively. A movable contact arm 25 associated with each of the banks is designed successively to engage the plurality of contacts and the contact arms 25 of the banks of each switch are ganged together to move in unison upon rotation of the associated control knob 26.

The contacts 0 to 7 of banks A of each of the switches are connected together by common lead 28 and thence by lead 29 to terminals TSU, TST and TSH respectively of swtches 22, 23, 24. The contacts 8 and 9 of each of the banks A are connected by common lead 31 to lead 32 which is connected to terminals TAU, TAT and TAH respectively of the three switches.

The contacts 0 through 3 of banks B; 0, 1, 4 and 5 of banks C and 0, 2, 4, 6 and 8 of banks D are connected to lead 29. Contacts 4 through 9 of banks B; contacts 2, 3, 6 through 9 of banks C and contacts 1, 3, 5, 7 and 9 of banks D are connected to lead 32. The contact arms 25 of banks A through D of switches 22, 23 and 24 are connected respectively to terminals TU8, TU4, TU2, and TU1; TT8, TT4, TT2 and TT1; TH8, TH4, TH2 and TH1.

Connected between adjacent contacts 0 through 9 of banks E of switches 22, 23 and 24 are weight resistors R1, R10 and R100 respectively, i.e., a resistor R1 is connected between contacts 1 and 2, etc. The contact arm 25 of bank E of switch 22 is connected to terminal TRW2, the contact 0 of bank E of switch 22 is connected by lead 33 to the contact arm 25 of bank E of switch 23; the contact 0 of bank E of switch 23 is connected by lead 34 to the contact arm 25 of bank E of switch 24, and the contact 0 of said bank E of switch 24 is connected to terminal TRW1. Thus, the resistors R1, R10, R100 are connected in series and form the weight resistor bank 35 (FIG. 4).

In the illustrative embodiment, each of the resistors R1 has a value of one ohm, resistors R10 have a value of ten ohms and the resistors R100 have a value of one hundred ohms related to units, tens and hundreds respectively.

ARM REGISTER (FIGS. 1 AND 3)

The arm register 41, shown in FIGS. 1 and 3, is similar to the weight register (FIG. 2) except that it only contains the bank E and has three switches 42, 43 and 44 related to units, tens and hundreds, each having a movable arm 25 controlled by an associated control knob 26. The resistors R1, R10 and R100 are connected in series between terminals TRA2 and TRA1 and form the arm resistor bank 45 (FIG. 4).

The resistors R1, R10 and R100 of the arm register similarly have values of one ohm, ten ohms and one hundred ohms, respectively related to units, tens and hundreds.

POSITION SELECTOR SWITCH (FIG. 4)

The equipment includes a position selector switch 48, a portion of which is shown in FIG. 4. This switch, which is manually operated by a control knob 49, has five banks A, B, C, D and E, each bank illustratively having ten fixed contacts, designated PC for primary condition, DC for desired condition, SL for station load, B, C, D, E, F, G for the respective compartments and GC for gross condition. The contacts of each of the banks A, B, C, D and E are designed to be successively engaged by an associated contact arm 51, said arms 51 being ganged together to move in unison upon rotation of control knob 49.

All of the contacts of bank B, except the contacts DC and GC are connected together by common lead 53 which is connected to terminal 54. The contact DC of bank B is connected by lead 55 to terminal 56 and by lead 57 to the contact GC of bank C. The contact GC of bank B is connected to terminal 58. All of the contacts of bank C, except contact GC are connected by common lead 59 to terminal 61.

The contact DC of bank D is connected by lead 62 to terminal 54 and the contact GC of bank D is connected to negative main N. The contacts PC, DC and SL of bank E are connected by common lead 64 to terminal 65; the contacts B, C, D, E, F, and G of said bank are connected respectively to a switch arm 63 of an aircraft type selector switch 70, controlled by knob 71. The arms 63 are ganged to move in unison upon rotation of knob 71 to engage either contact 70a or 70b in the illustrative embodiment shown. Connected to each of the contacts 70a is one end of an associated fixed resistor $RB_1$, $RC_1$, $RD_1$, $RE_1$, $RF_1$ and $RG_1$, the other end of said resistors being connected by common lead 66 to negative main N and also by said lead 66 to one end of fixed resistor 68, which illustratively has a value of 10 ohms, the other end of which is connected by lead 69 to contact GC of bank E. The resistors $RB_1$ through $RG_1$ are the compartment centroid resistors for the associated compartments of the aircraft to be loaded, selected by the setting of switch 70, and are of value related to the distance of the centroid of the compartment from a fixed reference datum, the resistors being calibrated so that one ohm is equal to one inch. The resistors $RB_2$-$RG_2$ connected to contacts 70b are for another type aircraft which may be selected by switch 70. The centroid resistors are preferably located in an adapter 75 (FIG. 1), a separate adaptor desirably being provided for each type of aircraft.

The terminal 54 is connected to terminal $TRW_2$ of the weight register resistors 35 (FIGS. 2 and 4) the terminal $TRW_1$ thereof being connected to positive main P. The terminal 61 is connected to one end of a fixed resistor 72, illustratively of 100 ohms, the other end of which is connected to negative main N. Terminal 56 is connected to terminal $TR_3$, FIGS 4 and 6 of the gross weight accumulator 73W, hereinafter described, and terminal $TR_4$ of such gross weight accumulator 73W is connected by lead 74 to contact arm 51 of bank D of the selector switch 48. The contact arm 51 of bank A is connected to positive main P and contact GC is connected to terminal 76. The contact arms 51 of banks B and C of the selector switch are connected by leads 77 and 78 respectively to junction 79 to which is connected one side of a phase sensitive amplifier unit 80 of conventional type. The other side of amplifier unit 80 is connected to junction 81 which in turn is connected by lead 82 to the contact arm 51 of bank E and also by lead 83 to terminal 84. Lead 66 is also connected to terminal $TRA_1$ of the arm register (FIG. 3) and the terminal 65 is connected to terminal $TRA_2$ of said arm register, the connections above described defining a bridge B-1.

GROSS WEIGHT ACCUMULATOR AND PROGRAMMER (FIG. 6)

Referring now to FIG. 6 of the drawings, the gross weight programmer 85W comprises a stepping switch 91 having four banks A, B, C and D, each with an "H" or home position contact, and fourteen additional contacts 1-14 designed to be successively engaged by an associated contact arm 92, said contact arms 92 being ganged together to move in unison.

The gross weight accumulator 73W comprises three stepping switches 93, 94, 95, each having three banks A, B and C each with eleven contacts designated H, 1 through 10 designed to be successively engaged by ganged contact arms 96, 97, 98. The contact arm 92 of bank A of stepping switch 91 is connected by lead 101 to one end of the coil 102 of said stepping switch, the other end of said coil being connected to ground. The contact arms 92 of banks B, C and D are connected by leads 103 to one end of the coils 104 of stepping switches 93, 94, 95, the other ends of said coils being connected to ground. The stepping switch 91 has two movable contact arms 105, 106, the former normally being spaced from fixed contact 105' and the latter normally engaging fixed contact 106' when coil 102 is not energized.

Each of the stepping switches 93, 94, 95 also has a movable contact arm 107 which normally engages fixed contact 107' when the associated coil 104 is not energized. Each of the stepping switches 91, 93, 94, 95 also controls a cam C-1, C-2, C-3, C-4 which has a projecting portion 111 normally engaging the end of a movable contact arm 112 to retain the latter spaced from fixed contact 113 when the associated stepping switch is in the home position.

The gross weight programmer and accumulator 85W, 73W also includes three transfer relays 115, 116 and 117, the relays 115, 116 each having three movable contact arms 118, 119 and 121 normally spaced from fixed contacts 118', 119' and 121' and the relay 117 has two movable contact arms 122 and 123 normally spaced from fixed contacts 122', 123'. The movable contact arms of each of the transfer relays 115, 116, 117 are ganged together and adapted to move in unison upon energization of the associated coil 125. In addition to the foregoing, a reset relay 126 is provided having three movable contact arms 127, 128 and 129 normally spaced from associated fixed contacts 127', 128' and 129' and a time delay relay 131 is also provided, said relay 131 having a movable contact arm 132 normally engaging fixed contact 132'.

The H contact of stepping switch 91 is connected by lead 135 to the fixed contact 136 of start switch 137 which is automatically controlled by the multiplier A programmer 217 (FIGS. 1 and 5) hereinafter described. The start switch 137 has another fixed contact 138 and a cross bar 139 is designed to engage the two fixed contacts to complete the circuit. The fixed contact 138 is connected by lead 141 to positive main P and by lead 142 to fixed contact 132' of time delay relay 131. The contact arm 132 of the time delay relay 131 is connected by lead 143 to common main 144 which connects the contacts 1 through 14 of stepping switch 91. One end of the coil 145 of time delay relay 131 is connected to ground and the other end of the coil is connected by lead 146 to movable contact arm 105 of stepping switch 91. The associated fixed contact 105' of said stepping switch 91 is connected by lead 147 to positive main P and by lead 148 to contact arm 106 and to fixed contact 113 of cam C-1. The fixed contact 106' of stepping switch 91 is connected by lead 151 to junction X and thence by lead 152 to fixed contacts 153 of Add, Subtract, switch controls 154, 155.

The movable contact arms 156, 157 of the Add, Subtract switches are connected respectively by lead 158 to terminals TAU, TAT and TAH and by lead 159 to terminals TSU, TST and TSH of banks A, B, C and D of weight resistor switches 22, 23, 24 respectively. In addition, lead 159 is connected by lead 161 through normally closed switch 162 to contact "1" of bank B of stepping switch 91.

Contact 2 of banks B, C and D of stepping switch 91 is connected by leads 165 to terminals TU1, TT1 and TH1, contacts 3 and 4 are connected by leads 166 to terminals TU2, TT2 and TH2, contacts 5 to 8 are connected by leads 167 to terminals TU4, TT4 and TH4 and contacts 9 and 10 are connected by lead 168 to terminals TU8, TT8 and TH8 of weight register switches 22, 23, 24 (FIG. 2).

The contact 11 of bank 8 of stepping switch 91 is connected by lead 171 to contact arm 119 of transfer relay 115. The contact 11 of bank C of stepping switch 91 is connected by lead 172 to contact arm 118 of relay 115. The contact 12 of bank C of stepping switch 91 is connected by lead 173 to contact arm 119 of relay 116. The contact 12 of bank D of stepping switch 91 is connected by lead 174 to contact arm 118 of relay 116.

The contact 13 of bank D of stepping switch 91 is connected by lead 175 to contact arm 122 of relay 117. The fixed contacts 118', 119' of relay 115 and 116 and the fixed contact 122' of relay 117 are connected by leads 176 to common lead 177 which is connected to junction X.

The movable contact arm 112 of cam C-1 is connected by leads 181 and 182 to the movable contact arms 121 of transfer relays 115, 116 and contact arm 123 of transfer relay 117. In addition, contact arm 112 of cam C-1 is connected by leads 181, 183 to the contact arms 97 of banks B of stepping switches 93, 94, 95.

The contact 113 of cam C-1 is connected by lead 185 to the contact arm 186 of a reset switch 187, the associated fixed contact 188 of which is connected to one end of the coil 189 of reset relay 187, the other end of said coil being connected to ground. The contact arm 186 is connected by lead 191 to the fixed contacts 127', 128', 129' of relay 126, the associated contact arms 127, 128, 129 of which are normally spaced therefrom and connected by leads 193, 194, 195 to the contact arms 112 of cams C-2, C-3, C-4. The fixed contacts 113 of said cams C-2, C-3 and C-4 are connected by lead 196 to the movable contact arms 107 of stepping switch 93, 94, 95, the associated fixed contact 107' of which is connected by lead 197 to lead 103.

Each of the banks A, B and C of switches 93, 94, 95 has a home or H contact and ten individual contacts 1 through 10 as is clearly shown in the drawings. Connected between the home contact and the first contact and the first and second contact of each of the banks A of the switches 93, 94, 95 up to and including the eighth to ninth contact, is a fixed resistor $R_1$ having a value illustratively of one ohm, R-10 having a value of ten ohms and R-100 having a value of 100 ohms respectively.

The H contact of bank A of stepping switch 93 is connected to terminal TR3. The contact arm 96 of said bank A is connected by lead 201 to the H contact of bank A of stepping switch 94; the contact arm 96 of said bank A is connected by lead 202, to the H contact of bank A of stepping switch 95 and the contact arm 96 of said bank A is connected to terminal TR4. Thus, the resistors R-1, R-10, R-100 are connected in series and define the gross weight accumulator resistor bank 203 (FIG. 4).

The "10" contact of each of the banks B of stepping switches 93, 94, 95 is connected by a lead 205 to fixed contacts 121', 123' and to one end of the coil 125 of the associated relay 115, 116, 117, the other end of said coils being connected to ground.

The gross moment programmer and accumulator 85M, 73M is substantially identical to the gross weight programmer and accumulator 85W, 73W, except that it does not have bank C, and hence will not be described. The remaining weight programmer and accumulator 85W', 73W' and remaining moment programmer and accumulator 85M', 73M' are also substantially identical to the gross weight accumulator and programmer 85W, 73W, both differing from the gross weight programmer and accumulator in the connections of the bank A of the associated stepping switches 93, 94, 95 (FIG. 7) and the remaining weight accumulator also has an additional bank C.

Thus, referring to FIG. 7, the terminal TR3 of the remaining moment and remaining weight accumulator is connected by lead 207 to the contact arm 96 of bank A of switch 93. The "10" contact of bank A is connected by lead 208 to the contact arm 96 of bank A of switch 94. The "10" contact of bank A of switch 94 is connected by lead 209 to the contact arm 96 of bank A of switch 95 and the "10" contact of bank A of switch 95 is connected to terminal TR4.

MULTIPLIER A BALANCING UNIT (FIG. 5)

The multiplier A balancing unit 210 shown in FIG. 5 comprises three stepping switches 212, 213, 214 related to units, tens and hundreds respectively. Each of the switches has six banks A, B, C, D, E and F, each with eleven fixed contacts designated H, 0 and 1 through 9. A movable contact arm 215 associated with each of the banks is designed successively to engage the plurality of contacts and the contact arms of the banks of each switch are ganged to move in unison upon actuation of the coil 216 of each stepping switch. One end of each of said coils 216 is connected to ground and the other end to multiplier A programmer unit 217 designed to actuate the coils in predetermined timed relation in the manner hereinafter set forth. As the operation of the programmer unit 217 is conventional, the circuit thereof will not be described.

The contacts 0-9 of the bank A of each switch 212, 213 and 214 is connected through an associated lamp 218 to ground and the contact arms of banks A are connected by lead 219 to terminal 76 (FIG. 4). The lamp serves as an indicator 220 of the center of gravity of the aircraft in inches.

The contacts H, 8 and 9 of banks B of stepping switches 212, 213, 214 are connected together by common lead 221 and thence by lead 222 to terminal TAU, TAT and TAH. The contacts 0, 1 through 7 of banks B are connected by common lead 223 and thence by lead 224 to terminal TSU, TST, TSH. The contacts H and 4 through 9 of banks C; H, 2, 3, 6-9 of bank D and H, 1, 3, 5, 7 and 9 of bank E are connected to lead 222. The contacts 0, 1, 2, 3 of bank C; 0, 1, 4, 5 of bank D and 0, 2, 4, 6 and 8 of bank E are connected to lead 224.

Connected between adjacent contacts 0—1, 1—2, etc. of banks E of stepping switches 212, 213 and 214 are resistors R-1, R-10 and R-100 related to units, tens and hundreds respectively, said resistors defining the multiplier A balancing resistors 225. The contact H of each bank F is connected by lead 227 to contact 9. The contact arm 215 of bank F of stepping switch 214 is connected by lead 228 to terminal 84 (FIG. 4). The "0" contact of said bank F is connected by lead 229 to the contact arm 215 of bank E of stepping switch 213. The "0" contact of bank F of stepping switch 213 is connected by lead 231 to the contact arm 215 of bank F of stepping switch 212 and the "0" contact of bank F of stepping switch 212 is connected by lead 232 to positive main P.

LOAD DETERMINATION UNIT (FIG. 9)

Referring to FIG. 9, the load determination unit comprises a stepping switch 251 which has seven banks A, B, C, D, E, F, G, each having nine contacts H and 1-8, designed to be successively engaged by the associated contact arm 252, the contact arms 252 of all of the banks, which normally engages the H contact being ganged together to move in unison.

The contacts 1, 4 and 5 of bank A are connected together by common lead 253 and this lead is connected by lead 254 to terminal T4M. The contact 2 of bank A is connected by leads 255 and 256 to terminal T1M and by leads 255 and 257 to contact 5 of bank E. The contact 3 of bank A is connected by lead 258 to one end of fixed resistor 259, the other end of which is connected by lead 261 to contact 3 of bank B. The contacts 6 and 7 of bank A are tied together and are connected by lead 262 to terminal TR5 of the ΔR storage register 263 (FIG. 10) hereinafter described, the terminal TR6 of which is connected by lead 264 to contacts 6 and 7 of bank B. The contact 8 of bank A is connected to one end of fixed resistor 265, the other end of which is connected by lead 266 to contact 8 of bank B. The contacts 1, 4 and 5 of bank B are connected together by common lead 267 and thence connected by lead 268 to terminal T2M. The contact 2 of bank B is connected by lead 269 to terminal T3M.

The contacts 1, 4, 5, 7 and 8 of bank C are connected by common lead 273 and lead 274 to terminal T4W. The contacts 2 and 3 of bank C are connected by leads 275 and 276 to terminal T1W and by leads 275 and 277 to contacts 5, 7 and 8 of bank G.

The contacts 1, 3, 4 and 5 of bank D are connected by lead 278 to terminal T2W. The contact 2 of bank D is connected by lead 279 to terminal T3W. The contacts 6 and 7 are connected by lead 281 to terminal TR6 of the ΔB storage register 282 (FIG. 11) and the terminal TR5 of said storage register is connected to negative main N. The contact 8 of bank D is connected to one end of fixed resistor 284, the other end of which is connected to negative main N.

The contact 4 of bank E is connected by lead 285 to terminal TR3 of the remaining moment accumulator 73M' (FIGS. 7 and 9), the terminal TR4 of said accumulator being connected to positive main P. Contact 4 of bank E is also connected by leads 285 and 286 to contacts 1 and 2 of bank F and the contacts 7 and 8 of bank E are connected to positive main P.

The contact 3 of bank F is connected to one end of fixed resistor 288, the other end of which is connected to positive main P. Contacts 4, 5, 7 and 8 of bank F are connected by lead 289 to terminal 291 of the multiplier B balancing unit 292. The contact 6 of bank F is connected to one end of fixed resistor 293, the other end of which is connected to positive main P.

Contacts 1, 2, 3 and 4 of bank G are connected by lead 294 to terminal TR3 of the remaining weight accumulator 73W (FIGS. 4 and 9), the terminal TR4 of which is connected to negative main N. Contact 6 of bank G is connected to one end of fixed resistor 295, the other end of which is connected to negative main N.

The contact arm 252 of bank A is connected to positive main P and the contact arm 252 of bank C is connected to negative main N. The contact arm 252 of bank B is connected by lead 296 to junction 297 and the contact arm 252 of bank G is connected by lead 298 to junction 299 and a phase sensitive amplifier 301 is connected between junctions 297, 299.

The contact arms 252 of banks D and F are connected by leads 302, 303 respectively to junctions 297, 299 and the contact arm 252 of bank E is connected by lead 304 to terminal 305 of multiplier B balancing unit, the connections thus described defining a bridge B-2.

MULTIPLIER B BALANCING UNIT (FIG. 9)

The multiplier B balancing unit 292, shown in FIG. 9, comprises three stepping switches 307, 308 and 309 related to units, tens and hundreds, respectively. Each of the switches has four banks, banks A shown in FIG. 9; Banks B shown in FIG. 10; banks C shown in FIG. 11 and bank D shown in FIG. 12, the latter bank being the indicating bank.

Each bank has 11 fixed contacts designated H, 0 and 1 through 9 respectively. A movable contact arm 311 associated with each of the banks is designed successively to engage the plurality of contacts and the contact arms of the banks of each switch are ganged to move in unison upon actuation of the coil 312 of each switch.

One end of each of said coils 312 is connected to ground and the other end to multiplier B programmer unit 313 designed to actuate the coils in predetermined timed relation in the manner hereinafter set forth. As the operation of the programmer unit 313 is conventional, the circuit thereof will not be described.

Connected between adjacent contacts 0—1, 1—2, etc. of banks A of stepping switches 307, 308, 309 are resistors R-1, R-10 and R-100 related to units, tens and hundreds respectively, said resistors defining the multiplier B balancing resistors 314. The contact H of each of the banks A is connected by lead 315 to contact 9 of the associated bank. The contact arm 311 of bank A of stepping switch 309 is connected by lead 316 to terminal 291. The zero contact of said bank A is connected by lead 317 to the contact arm 311 of bank A of stepping switch 308. The zero contact of bank A of stepping switch 308 is connected by lead 318 to the contact arm 311 of bank A of stepping switch 307 and the zero contact of bank A of stepping switch 307 is connected by lead 319 to terminal 305. The multiplier B programmer shown in FIG. 9 also controls the coil 321 of stepping switch 251 so that the latter will be cycled in manner determined by the operation of the multiplier B programmer 313.

The banks B and C of the multiplier B balancing unit 292 control the ΔR and ΔB storage registers 263, 282 (FIGS. 10 and 11). Thus, referring to FIG. 10, the H and 9 contact of bank B are connected by lead 325. The zero and 1 through 9 contacts of bank B of switches 307, 308, 309 are connected by associated leads 326 to the corresponding contacts "0," 1 through 9 of bank B of stepping switch 327, 328 and 329 of the ΔR storage register 263. Each of the switches 327, 328, 329 has a bank A also with a "0" and 1 through 9 contact.

Connected between contacts 0—1, 1—2, etc., of the contacts of bank A of switches 327, 328, 329 are resistors R-1, R-10 and R-100, related to units, tens and hundreds, respectively, said resistors defining the ΔR storage resistors 330. The banks A and B of stepping switch 327, 328, 329 each has an associated contact arm 331, 332, the contact arms 331, 332 of each of said switches being ganged to move in unison upon actuation of the coil 333 of the associated switch.

The contact arm 332 of banks B of each of the switches 327, 328, 329 is connected to one end of an associated coil 334 of a relay 335, 336 and 337, the other end of each of said coils being connected to ground. Each of the relays 335, 336 and 337 has a movable contact arm 338 normally engaging a fixed contact 339 when the relay is not energized. The fixed contacts 339 of each of the relays 335, 336, 337 are connected together by common lead 341 which is connected to the contact arms 311 of blanks B of relays 307, 308, 309. In addition, said common lead 341 is connected to fixed contact 342 of ΔR switch 343, the movable contact arm 344 of which is connected to positive main P.

The movable contact arm 338 of each of the relays 335, 336, 337 is connected by lead 346 to the fixed contact 347 of each of the stepping switches 327, 328, 329, the movable contact arm 348 thereof normally engaging the associated fixed contact and being connected to one end of the coil 333 of the associated relay, the other end of said coil being connected to ground.

As is clearly shown in FIG. 10, the terminal TR5 of the R storage register 263 is connected by lead 349 to the "0" contact of bank A of switch 329. The contact arm 331 of said bank A is connected by lead 351 to the zero contact of bank A of switch 328. The contact arm 331 of bank A of switch 328 is connected by lead 352 to the zero contact of bank A of switch 327 and the contact arm 331 of said bank A of switch 327 is connected by lead 353 to terminal TR6.

As the circuits for banks C of switches 307, 308, 309 and the ΔB storage register shown in FIG. 11 are identical to the circuits for banks B and the ΔR storage register shown in FIG. 10, they will not be described, the corresponding elements having the same reference numerals.

The indicating bank D shown in FIG. 12 has its contacts 0 and 1–9 connected by leads 354 to one side of a lamp 355, the other side of the lamps being connected to ground.

The contact arms 311 of banks D are connected by common lead 356 to fixed contact 357 of switch 358, the contact arm 359 of which is connected to positive main P and the H contact of each bank is connected by lead 361 to the 9 contact thereof. Thus, the unit shown in FIG. 12 defines the load director indicator 362.

COMPARTMENT SELECTION AND CONTROL UNIT (FIG. 13)

The equipment in the illustrative embodiment shown is capable of planning the loading of an aircraft having a maximum of six compartments, B through G respectively. It is within the scope of the equipment to load combinations of such compartments and to this end a compartment selection and control unit 369 is provided.

Thus, referring to FIG. 13, six relays 370 to 375 are provided. Each of the relays 370 and 375 has five movable contact arms 376, 377, 378, 379 and 380, the contact arm 376 having associated fixed contacts 376', 376''; the contact arm 377 having an associated fixed contact 377'; the contact arm 378 having associated fixed contacts 378', 378''; the contact arm 379 having associated fixed contacts 379', 379''; and the contact arm 380 having an associated fixed contact 380'. The relays 371 to 374 in addition to the contact arms 376 to 380 has an additional contact arm 381 with an associated fixed contact 381'.

As shown, the movable contact arms of each of the relays are ganged together to move in unison and when the relays are not energized, contact arm 376 engages contact 376''; contact arm 377 is spaced from contact 377'; contact arm 378 engages contact 378''; contact arm 381 is spaced from contact 381'; contact arm 379 engages contact 379'' and contact arm 380 is spaced from contact 380'.

Associated with the relays are five additional banks of the position selector switch 48, i.e., banks F, G, H, I, J. Each of said banks has a contact arm 51 and has ten contacts PC, DC, SL, B through G and GC.

One end of the coils 382 of relays 370 through 375 is connected to ground and the other end of each of said coils is connected through an associated lead 383 to the contact arm 384 of a switch 385B–385G normally spaced from the associated fixed contact 386 which is connected to common main 387. One end of main 387 is connected to positive main P and the other end is connected to the contact arm 51 of bank J of the position selector switch 48.

The lead 383 connected to coil 382 of relay 370 is connected by lead 388 to the contact C of bank J of the position selector switch 48. The leads 383 associated with the coils 382 of relays 371 through 375 are connected by associated leads 389 through diodes 391 to contacts D, C, F, G, and GC respectively of bank J.

In addition, the contacts C to D, D to E, E to F, F to G and G to GC are connected through associated diodes 392. The diodes 392 are connected so that current will flow from the contact GC toward the contact G, from contact G to contact F and so on and the diodes 391 are so connected that current will flow from the contacts D, E, F, G and GC to the coil of the associated relay but not in the opposite direction.

The various contacts controlled by the relays 370 through 375 are connected to fixed resistors, preferably located in the adaptor 75 for each of the aircraft types to be loaded. These resistors are represented by the reference numerals RWB1 through RWG1, RMB1 through RMG1; RWB2 through RWG2 and RMB2 through RMG2. The associated banks of resistors RW, RM are related to the compartments of the particular aircraft selected to be loaded which is determined by the setting of the aircraft type switch 70. Thus, in the illustrative embodiment shown in one position of the switch 70 a circuit will be completed through the movable contact arms 395 thereof to the resistors RWB1–RWG1 designated WΣ and RMB1–RMG1 designated MΣ, and in the other position of the switch to the resistors RWB2–RWG2, RMB2–RMG2.

Assuming that the aircraft to be loaded has the following characteristics:

Chart I

| Compartment | Maximum Wgt. | Centroid | Moment |
|---|---|---|---|
| B | 2,000 | 200 | 400,000 |
| C | 5,000 | 300 | 1,500,000 |
| D | 5,000 | 350 | 1,750,000 |
| E | 4,000 | 400 | 1,600,000 |
| F | 3,000 | 480 | 1,440,000 |
| G | 1,000 | 530 | 530,000 |

Assuming that one inch equals 1 ohm for the centroid; 100 pounds equals 1 ohm for the weight and 1,000 inch pounds equals 1 ohm for the moment, then the resistors RWB1–RWG1; RMB1–RMG1 and RB1–RG1 will have the following values:

Chart II

| Compt. | Resistors | Ohms | Resistor | Ohms | Resistor | Ohms |
|---|---|---|---|---|---|---|
| B | RWB1 | 20 | RMB1 | 400 | RB1 | 200 |
| C | RWC1 | 50 | RMC1 | 1,500 | RC1 | 300 |
| D | RWD1 | 50 | RMD1 | 1,750 | RD1 | 350 |
| E | RWE1 | 40 | RME1 | 1,600 | RE1 | 400 |
| F | RWF1 | 30 | RMF1 | 1,440 | RF1 | 480 |
| G | RWG1 | 10 | RMG1 | 530 | RG1 | 530 |

The resistors RWB1 through RWG1 are connected in series with the free end of resistor RWB1 connected to terminal T1W (FIG. 13) and the free end of resistor RWG1 connected to contact 396 engaged by contact arm 395 which is connected to terminal T2W. There is a fixed contact 396 associated with the junctions between resistors RWB1 and RWC1, RWC1 and RWD1, etc. and each of such fixed contacts will be engaged by the associated contact arm 395 when the particular aircraft associated with such resistors, is to be loaded. The resistors RMB1 through RMG1 are connected in a similar manner.

Thus, as is clearly shown, the free end of resistor RMB1 is connected to terminal T1M and the free end of resistor RMG1 is connected to fixed contact 396 engaged by the contact arm 395 associated with resistor RMG1 and connected to terminal T2M.

The contact arm 377 of relay 370 is connected by lead 397 to terminal T1W; by leads 397 and 398 to the contact arm 51 of bank I of the position selector switch 48 and by lead 399 to the fixed contact 376' of relay 371. The fixed contact 377' of relay 370 is connected by lead 401 to the fixed contact 376'' and contact arm 377 of relay 371; and by leads 401, 402 and 403 to contact B of bank H and by leads 402, 404 to the movable contact arm 395 between resistors RWB1—RWC1.

The contact arm 376 of relay 371 is connected by lead 405 to the fixed contact 376' of relay 372; contact arm 376 of relay 372 is connected to the fixed contact 376' of relay 373; contact arm 376 of relay 373 is connected to the fixed contact 376' of relay 374 and the contact arm 376 of relay 374 is connected to the fixed contact 376' of relay 375. The contact arm 376 of relay 375 is connected to terminal T3W.

The fixed contacts 377' of relays 371 through 374 are connected by associated leads 406, 407, 408 to the contacts C, D, E and F of bank H of the position selector switch and also by leads 409 to contact arms 395 between resistors RWC1—RWD1; RWD1—RWE1; RWE1—RWF1; RWF1—RWG1 and the fixed contact 377' of relay 375 is connected by lead 411 to terminal T2W.

The contact arms 377 and fixed contact 376'' of relays 372–375 are connected together respectively and each is then connected to its associated lead 407. The contacts B–F of bank H are connected by leads 415 to contacts C–G respectively of bank I, the contact arm 51 of said bank H being connected to terminal T4W.

As the circuits for the contact arms 379 and 380 and associated fixed contacts of the relays 370–375 as well as banks F and G and the resistors RMB1 through RMG1 is identical to that previously described, no further description thereof will be made.

With respect to the additional bank of contact arms 378, 381 and associated fixed contacts controlling the coil 416 of relay 417, the contact arm 378 of relay 370 is connected to positive main P, the fixed contacts 378' and 378" are connected to contact arm 378 and fixed contact 381' of relay 371. The contact arm 381 and fixed contact 378" of relay 371 are connected together and connected to fixed contact 381' of relay 372 and the fixed contact 378' of relay 371 is connected to the contact arm 378 of relay 372. These connections are repeated and the contact arm 381 and fixed contact 378" of relay 374 are connected to the fixed contact 378' of relay 375. The fixed contact 378' of relay 374 is connected to the fixed contact 378" of relay 375 and the movable contact arm 378 of said relay 375 normally engaging said fixed contact 378" is connected to one end of the coil 416 of relay 417, the other end of said coil being connected to ground.

The relay 417 has a contact arm 421 connected to positive main P and normally spaced from fixed contact 422 connected through lamp 423 to ground, the lamp serving as an indication of the last compartment to be loaded.

To ready the equipment for the planning operation the reset switches 187 (FIG. 6) of the gross weight accumulator and programmer 73W, 85W, the gross moment accumulator and programmer 73M, 85M, the remaining weight accumulator and programmer 73W', 85W' and the remaining moment accumulator and programmer 73M', 85M' are closed. Referring to the gross weight accumulator and programmer 73W, 85W (FIG. 6) which is typical, this will energize reset relay 126 completing a circuit from ground through the coil 189, the now closed switch 187, leads 185, 148, 147 to positive main P. Energization of relay 126 will cause the movable contact arms 127, 128, 129 thereof to engage the associated fixed contacts 127', 128', 129' to complete a circuit from positive main P through leads 147, 148, 185, 191 and the closed contacts 127, 128, 129 of relay 126, leads 193, 194, 195 to the contact arms 112 of cams C–2, C–3 and C–4 associated with stepping switches 93, 94 and 95.

If these stepping switches are not at home position at this time, the contact arms 112 will be engaging the associated fixed contact 113 to complete a circuit from positive main P to the contact arm 107 of stepping switches 93, 94 and 95 which normally engage the associated fixed contact 107', and through the coil 104 of the associated stepping switch to ground.

As a result, the stepping switches 93, 94, 95 will be energized in conventional manner so that the contact arms 96, 97, 98 thereof will be moved step by step until they reach the "H" or home position at which time the cams C–2, C–3, C–4 will open the associated cam contacts 112, 113 to break the circuit from positive main P thereby stopping further stepping movement of the stepping switches 93, 94, 95 with the equipment ready for operation. At this time the reset switches 187 are released. The gross moment accumulator and programmer, the remaining weight accumulator and programmer and the remaining moment accumulator and programmer which are substantially identical to the gross weight accumulator and programmer shown in FIG. 6 are reset in similar manner.

The equipment is now ready to be set for the planning operation.

At this time the aircraft selector switch 70 (FIGS. 4, 13) is set to the aircraft type position for which loading is to be planned. As a result of the setting of the aircraft type switch, referring to FIGS. 4 and 13, the resistors RB1 through RG1, RWB1 through RWG1 and RMB1 through RMG1, will be connected in circuit.

Assuming that the primary weight of the aircraft (aircraft with all but its cargo) is 22,700 pounds, the weight register (FIG. 2) is set to this value in the following manner. As the unit switch 22 represents units of 100 pounds, the tens switch 23 represents units of 1,000 pounds and the hundreds switch 24 represents units of 10,000 pounds, to set 22,700 pounds into the circuit, knobs 26 associated with the hundreds, tens and units switches are set to 2—2—7 respectively.

Referring to FIG. 2 with the switches thus set, the associated contact arm 25 of banks A, B, C, D and E of the hundreds switch 24 will be engaging the 2 contact of each bank; the contact arm 25 of the tens switch 23 will be engaging the 2 contact of each bank and the contact arm 25 of the unit switch 22 will be engaging the 7 contact of each bank. Since each of the resistors in bank E of the units switch 22 has a value of 1 ohm, the tens switch 10 ohms and the hundreds switch 100 ohms, and one ohm equals 100 pounds, since the resistors of bank E are connected in series, 227 ohms will be placed in circuit in between terminals TRW1 and TRW2 proportional to the weight of 22,700 pounds.

The arm register (FIG. 3) is set to a value proportional to the primary center of gravity to the aircraft, i.e., 200 inches from the reference datum. To this end the hundreds switch 44 is set to 2 representing 200 ohms; the tens switch 43 is set to 0 representing 0 ohm and the units switch 42 is set to "0" representing 0 ohm. Thus, 200 ohms will be connected in series between terminals TRA1 and TRA2.

Prior to the setting of the weight and arm registers 21 and 41, the control knob 49 of the position selector switch 48 (FIGS. 4 and 13) is set to the first or PC (Primary Condition) position.

As a result, referring to FIG. 4, a circuit will be completed from positive main P, teminal TRW1, weight resistor bank 35 of the weight register 21 which has a value of 227 ohms, terminal TRW2, terminal 54, contact PC of bank B of the position selector switch 48 through contact arm 51, lead 77 to junction 79 of bridge B–1 so that the resistor bank 35 forms one arm of bridge B–1.

As contact arm 51 of Bank C of the position selector switch is engaging contact PC, a circuit will be completed to junction 79 from negative main N through the fixed resistor 72 which has a value of 100 ohms and this resistor 72 will form a second arm of bridge B–1. The contact arm 51 of bank E of the position selector switch, which is now engaging contact PC, will complete a circuit from negative main N, lead 66, terminal TRA1, arm resistor bank 45 of the arm register 41 which has a value of 200 ohms, terminal TRA2, terminal 65, lead 64, contact arm 51, lead 82 to junction 81 of bridge B–1 to form the third arm of said bridge. The fourth arm of the bridge is defined by the series connected balancing resistors 225 of bank F of multiplier A balancing unit 210, one end of which is connected to junction 81 through lead 228, terminal 84 and lead 83 and the other end of which is connected through lead 232 to position main P.

The fourth arm of bridge B–1 is the balancing arm, the setting of which is controlled by the actuation of the stepping switches 212, 213, 214. As previously described a phase sensitive amplifier 80 of conventional type is connected between junctions 79 and 81 and the output of the phase sensitive amplifier through the multiplier A programmer 217 controls the stepping switches 212, 213, 214 to determine the setting of the series connected resistors in bank E.

At this time the bridge B–1 has in one arm resistors 35 of value of 227 ohms related to a weight of 22,700 pounds. The second arm has a resistor 72 having a value of 100 ohms. The third arm has resistors 45 having a value of 200 ohms proportional to the primary center of gravity of 200 inches and the fourth arm has the multiplier A balacing resistors 225 which will be set to balance the bridge in the following manner.

The manual start switch S shown in FIGS. 1 and 5, is closed to energize the multiplier A programmer. As a result, the multiplier A programmer 217, first homes the stepping switches 212, 213, 214 (FIG. 5) in conventional manner so that all of the contact arms 215 thereof are set to position H or home position which is tied to position 9 and the resistors of banks F of the stepping switches, which are connected in series, have a value of 999 ohms (each resistor R–1 in the unit switch 212 has a value of 1 ohm, each resistor R–10 in the tens switch 213 has a value of 10 ohms and each resistor R–100 in the hundreds switch 214 has a value of 100 ohms). The programmer 217 then automatically steps the hundreds switch 214 to the "0" position at which time there will be only 99 ohms in circuit. Thereupon, the programmer 217 connects the output of the phase sensitive amplifier 80 to actuate the hundreds stepping switch 214.

Since at this time we have 227 ohms in one arm of the bridge, 100 ohms in a second arm and 200 ohms in the third arm, for the bridge B–1 to be in balance, the fourth arm or balancing resistors bank 225 must have a value of 454 ohms. Since the hundreds switch 214 has been stepped to "0", the resistor bank 225 has a value of 99 ohms and the bridge B–1 is not in balance. Hence, pulses delivered by the phase sensitive amplifier 80 will cause the hundreds stepping switch 214 to increase the resistance value of the hundreds resistors in steps of 100 ohms until there is either a balance or a phase reversal of the signal voltage from the bridge, i.e., if the value of the multiplier A resistance equals or exceeds 454 ohms. For example, when the hundreds switch 214 is pulsed to contact 4 the resistor bank 225 will have a value of 499 ohms which exceeds the desired value of 454 ohms, thereby causing phase reversal in the amplifier. At this time no further pulses will be delivered to the hundreds stepping switch 214.

Through the multiplier A programmer 217 the tens switch 213 is stepped to "0". At this time there will be 409 ohms in resistor bank 225 which is less than the desired balancing value of 454 and the phase sensitive amplifier 80 through the programmer 217 will now pulse the tens switch 213 to contact 5. At this time there again will be a phase reversal in the amplifier 80, since the resistor bank 225 will have a value of 459 ohms in excess of the desired value of 454. Again no further pulses will be delivered to the tens switch 213 and the multiplier A programmer 217 will move the units switch 212 to "0" position. Thus there will be 450 ohms in the resistor bank 225 and the programmer 217 will connect the amplifier 80 to deliver pulses to the units stepping switch 212 and when such stepping switch reaches the "4" position, at which time the resistor bank 225 will have a value of 454 ohms, the bridge B–1 will be in balance and hence there will be no output from the phase sensitive amplifier 80. The programmer 217 then automatically cycles to the next step of its operation to be hereinafter described.

Thus far the resistor bank 225 has been set to a value of 454 ohms which is proportional to a moment of 4,540,000 inch pounds, the product of the primary weight of the aircraft of 22,700 pounds and the primary center of gravity of 200 inches. At this time the primary moment of 4,540,000 inch pounds has been determined by the setting of the resistor bank 225 and the weight resistors 35 have been set to the primary weight of 22,700 pounds.

This information is now transmitted to the gross weight accumulator 73W, the gross moment accumulator 73M and the remaining moment accumulator 73M′.

As the construction of the gross weight accumulator and programmer, the gross moment accumulator and programmer and remaining moment accumulator and programmer are substantially identical except for the resistors R–1, R–10 and R–100 which in the case of the remaining moment and gross moment accumulators have a value of 10, 100 and 1,000 ohms respectively rather than 1, 10 and 100 ohms, only the operation of the gross weight accumulator and programmer shown in FIG. 6 will be described in detail.

As previously described, after the primary condition balancing operation is completed, the multiplier A programmer 217 is cycled to ready the equipment for the next operation which is the setting of the gross weight, the gross moment and the remaining moment accumulators.

The add switch 154 of each of the units 85W, 73W; 85M, 73M; and 85M′, 73M′ is closed momentarily and the multiplier A programmer 217 automatically closes the start switch 137 (FIG. 7) of each of said units momentarily. Referring to FIG. 6, a circuit will be completed from positive main P lead 141 through the closed start switch 137 to the H contact of bank A of stepping switch 91, contact arm 92, through the coil 102 of switch 91 to ground. Since the start switch 137 is closed only momentarily, upon opening thereof, the contact arms 92 of banks A, B, C and D of stepping switch 91 move from H to 1 position in conventional manner. When stepping switch 91 was momentarily energized its associated contacts 105, 105′ and 106, 106′ closed and opened respectively.

When contacts 105, 105′ closed, a circuit was completed from positive main P, leads 147, 146 through the coil 145 of time delay relay 131 to ground to open the normally closed contacts 132, 132′ of said relay. When contacts 105, 105′ open, although the circuit to relay 131 is broken, its contacts 132, 132′ do not close, for a predetermined time interval. Upon closing of contacts 132, 132′, stepping switch 91 is again energized, the circuit being from positive main P, leads 141, 142, closed contacts 132, 132′, leads 143, 144, contact 1 of bank A of switch 91, contact arm 92 through coil 102 to ground and the cycle above described is repeated. Thus, the contact arms 92 of banks A, B, C and D of stepping switch 91 move from contact to contact at a time interval based upon the setting of time delay relay 131. This operation continues until the contact arm 92 of bank A of stepping switch 91 gets back to H position at which time it is connected to the now open start switch 137 and the cycling stops.

During the operation of the stepping switch 91 with each de-energization thereof it closed the circuit from positive main P through lead 147, contacts 106, 106′ to junction X, and thence through lead 152, closed contacts 153, 156 of switch 154, lead 158 to terminals TAU, TAT and TAH of the weight register 21 shown in FIG. 2.

As previously described, since the contact arms 25 of the banks of the hundreds, units and tens switches 24, 23, 22 of the weight register 21 at at positions 2—2—7 respectively, the terminal TAH will be connected to terminal TH2; the terminal TAT will be connected to terminal TT2 and the terminal TAU will be connected to terminal TU1, TU2 and TU4. Hence, referring to FIG. 6, positive main P is connected to such terminals TH2, TT2 and TU1, TU2 and TU4 intermittently with each movement of stepping switch 91.

As previously described, the contact arms 92 of banks A to D of stepping switches 91 (FIG. 6) are ganged together. Hence, when the contact arm 92 of bank B of switch 91 reaches contact 2 (the switch 162 being opened by the programmer 217 at this time so that the engagement of contact 1 by the contact arm 92 of bank B will have no effect), the stepping switch 93 will be energized. When the contact arm 92 of switch 91 is stepped as previously described from contact 2 to 3, the coil 104 of switch 93 will be de-energized and energized again and its contact arm 96, 97, 98 will move from H position to 1 position. This procedure is repeated as the stepping switch 91 completes its cycle and as the contact arm 92 of bank B of switch 91 cycles from position 2 past position 8, 7 pulses will be delivered from terminals TU1, TU2, TU4 to the coil 104 of stepping switch 93 due to the setting of the units switch 22 of the weight register 21 and its contact arms 96 and 97 will be moved to contact 7. As the contact arms 92 of banks C and D of stepping switch 91 sweep from contacts H through contact 14, contacts 3 and 4 of bank C of switch 91 will be connected to positive main P through terminal TT2 and contacts 3 and 4 of bank D of switch 91 will be connected to positive main P through terminal TH2 due to the setting of the tens and hundreds weight switches 23, 24 of the weight register. Hence, two pulses will be determined from terminals TT2 and TH2 to the coils 104 of the stepping switches 94 and 95 and the contact arms 96, 97, 98 of each said stepping switches will be moved to contact 2. At this time there will be 227 ohms connected in series in the resistor bank 203 between terminals TR3 and TR4 of the gross weight accumulator (FIG. 5) which is proportional to a weight of 22,700 pounds and the position of the weight register has been duplicated in the setting of the gross weight accumulator resistors 203.

As the contact banks B, C, D, E and F of the multiplier A balancing switches 212, 213, 214 (FIG. 5) correspond to the banks A, B, C, D and E of the weight register 21, in a similar manner, the gross moment accumulator 73M will be set to contacts 4, 5, 4 (hundreds, tens, units) corresponding to a moment of 4,540,000 inch pounds.

Similarly, the remaining moment accumulator 73M' which is connected in parallel with the gross moment accumulator 73M will have the contact arms 96, 97 of its stepping switches 93, 94, 95 (FIG. 7) set to contacts 4, 5, 4.

The remaining moment accumulator (FIG. 7) differs only from the gross weight accumulator (FIG. 6) in the connections of the resistors in bank A and the value of resistors R-1, R-10 and R-100. Thus, with the contact arm 96 of bank A (FIG. 7) at contacts 4—5—4, five resistors R-100; four resistors R-10 and five resistors R-1 will be in series to provide the complement of nine. Thus, when the switches are set to contacts 4—5—4 the resistance between terminals TR3, TR4 of the remaining moment accumulator (FIG. 7) will have a value of 5,450 ohms, the complement of 9—9—9 for 4—5—4.

At this time the multiplier A programmer has completed the cycle for the primary condition setting of the position selector switch 48 and the gross weight, the gross moment and remaining moment accumulator have been set to 227 ohms (22,700 pounds), 454 ohms (4,540,000 inch pounds) and 5,450 ohms (the complement of 9 for 4,540 ohms or 4,540,000 inch pounds) and the equipment is ready for the next step in the cycle of operation.

The add switches 154 are now opened and in the next step of operation the position selector switch 48 is turned to DC or desired condition.

Assuming that a cargo weight of 9,300 pounds is to be carried and the desired final take-off center of gravity is to be 240 inches, the weight register switches 24, 23, 22 (FIG. 2) are set to contacts 0—9—3, respectively or 93 ohms representing a weight of 9,300 pounds and the arm register switches 24, 23, 22 are set to contacts 2—4—0 respectively or 240 ohms representing an arm of 240 inches.

The bridge B-1 (FIG. 4) now has in one arm the weight resistors 35 from the weight register 21 which have a value of 93 ohms related to the desired cargo weight of 9,300 pounds and in series therewith the weight resistance 203 from the gross weight accumulator 73W previously set to 227 ohms representing the primary weight of 22,700 pounds. Consequently, this arm of the bridge has 320 ohms in circuit representing a weight of 32,000 pounds connected in series between positive main P and junction 79. This total weight of 32,000 pounds is the desired gross take-off weight.

The resistor 72 which has a value of 100 ohms is also connected to junction 79 to form a second arm of bridge B-1. The arm register resistors 45 which have a value of 240 ohms related to a desired take-off center of gravity of 240 inches is connected to junction 81 of the bridge B-1 to form a third arm, and the multiplier A balancing resistors 225 of bank E connected to junction 81 are the fourth arm of the bridge.

Since 320 ohms is in one arm of the bridge proportional to a weight of 32,000 pounds and 240 ohms in the second arm of the bridge related to the center of gravity of 240 inches and since the fixed resistor 72 has a value of 100 ohms, for the bridge B-1 to balance the multiplier A resistor 225 of bank E must have a value of 768 ohms, proportional to a desired take-off moment of 7,680,000 inch pounds.

As previously described, the multiplier A programmer 217 is actuated by closing the manual start switch S (FIG. 1) and the stepping switches 212, 213, 214 are cycled by the multiplier A programmer 217 to home position, placing resistors in circuit of a value of 999 ohms as previously described. Thereupon, the multiplier A programmer 217 cycles the hundreds switch 214 from home to "0" position so that a total of 99 ohms is now in circuit. As previously described, the output of the phase sensitive amplifier 80 will control the cycling of the stepping switches 214, 213, 212 until they are set to contacts 7, 6, 8 or 768 ohms proportional to a value of 7,680,000 inch pounds which will balance the bridge B-1.

At this time the subtract switches 155 of the accumulators 73W, 73M, 73W', 73M' are closed (see FIG. 6 for typical circuit).

Since the subtract switch 155 (FIG. 2) of the remaining moment accumulator is closed and since the switches (FIG. 5) 214, 213 and 212 are set to contacts 7—6—8, the terminal TSH is connected through the 7 contact of bank B of switch 214 to terminal TH8 of the remaining moment accumulator (FIG. 6) terminal TST is connected through the 6 contact of banks B and E of switch 213 to terminals TT8 and TT1 and the terminal TSU is connected through the 8 contact of bank E of switch 212 to terminal TU1.

Since the remaining moment accumulator switches 95, 94, 93 (FIG. 7) have previously been set to the primary moment, i.e., contacts 4—5—4 and as normally closed switch 162 (FIG. 6) is opened by the multiplier A programmer 217 in the DC or desired condition position of the position selector switch 48, as switch 91 cycles, one pulse is delivered from terminal TU1 to switch 93, 3 pulses from terminals TT1, TT8 to switch 94, and 2 pulses from terminal TH8 to switch 95, the contact arms 96 (FIG. 6) of switches 93, 94, 95 will be moved to contacts 5, 8, 6.

As contact arm 96 of switches 93, 94, 95 of the remaining moment accumulator (FIG. 7) are at position 5—8—6 respectively, resistance of 40 ohms, 100 ohms and 3,000 ohms is connected in series for a total of 3,140 ohms, between terminals TR3, TR4 of the remaining moment accumulator. Thus as 7,680,000 inch pounds is the desired gross take-off moment and 4,540,000 inch pounds was the primary moment, the difference or remaining moment is 3,140,000 inch pounds represented by 3,140 ohms or 5—8—6.

Since the remaining weight programmer and accumulator 85W', 73W' had been originally set to home position by the action of the associated reset switch 187, and the weight register switches 24, 23, 22 (FIG. 2) are at position 0—9—3 (i.e. 93 ohms) for a weight of 9,300 pounds, and since the unit switch 22 is at 3 contact the terminal TSU will be connected to terminals TU4, TU8. Since the tens switch 23 is at 9 position, terminal TST will be open circuited. Since the hundreds switch 24 is at "0" position, terminal TSH will be connected to terminals TH1, TH2, TH4, TH8.

Consequently, as previously described, the contact arms 96 of the remaining weight accumulator switches 93, 94, 95 (FIGS. 6 and 7) will be pulsed and set to contacts 6—0—9. Since the resistors in bank A (FIG. 7) are connected as indicated, there will be 93 ohms in circuit between terminals TR4—TR3 corresponding to a weight of 9,300 pounds.

The cycling of the equipment for the desired condition operation has been completed and the remaining weight accumulator has been set to 93 ohms related to the remaining weight of 9,300 pounds to be loaded and the remaining moment accumulator has been set to 3,140 ohms related to the remaining moment 3,140,000 inch pounds, the difference between the desired gross moment and primary moment.

The position selector switch 48 is set to the station load SL position. Assuming that 1,000 pounds preload is to be positioned at a location that is 380 inches from the reference datum, the weight register switches (FIG. 2) 24, 23 and 22 are manually set to positions 0—1—0, proportional to a weight of 1,000 pounds. The arm register switches 44, 43, 42 (FIG. 3) are set to 3—8—0 respectively, related to a distance of 380 inches. The start switch S (FIG. 5) of the multiplier A programmer 217 is closed to energize the multiplier A programmer and the add switches 154 (FIG. 6) of the four programmer accumulators are closed.

Referring to FIG. 4, the bridge B–1 will have in one arm, weight resistor 35 having a value of 10 ohms proportional to a weight of 1,000 pounds which is connected from positive main P through contact SL of bank B of switch 48 to junction 79 of the bridge; in the second arm the fixed resistor 72 which has a value of 100 ohms which is connected through negative main N and contact SL of bank C to junction 79; in the third arm the arm register resistors 45 which have a value of 380 ohms connected from negative main N through contact SL of bank E to junction 81 of the bridge and in the fourth arm the multiplier A balancing resistors 225.

As previously described, the bridge B–1 will now balance when the resistors 225 have a value of 38 ohms, i.e., $$\frac{10}{100} = \frac{X}{380}$$

where X will equal 38. A this time the switches 214, 213, 212 of multiplier A are set to positions 0, 3, 8 related to a moment of 380,000 inch pounds.

The switches 95, 94, 93 of the remaining weight accumulator 73W' (FIG. 7) which were previously set to position 9—0—6 will now be pulsed in the manner previously described to position 9—1—6. In this position, 83 ohms will be in circuit proportional to a remaining weight of 8,300 pounds.

The switches 95, 94, 93 of the gross weight accumulator 73W were previously set to positions 2—2—7 so that 227 ohms were in circuit proportional to a primary weight of 22,700 pounds. As a result of the addition of the station load weight of 1,000 pounds, the switches 95, 94 and 93 will be pulsed to position 2—3—7 so that 237 ohms will be connected in series between terminals TR3 and TR4 proportional to a weight of 23,700 pounds.

The remaining moment accumulator switches 95, 94, 93 were previously set to position 6—8—5, related to a resistance of 3,140 ohms which is proportional to the then remaining moment of 3,140,000 inch pounds, one ohm being equal to 10,000 inch pounds. As 380,000 inch pounds are to be subtracted from such remaining moment of 3,140,000 inch pounds by reason of the addition of the station load of 1,000 pounds at a centroid of 380 inches from the reference datum, in the manner previously described, the switches 95, 94, 93 of the remaining moment accumulator 73M' (FIG. 7) will be pulsed to positions 7, 2, 3. As the resistors R–1 will have a value of 60 ohms, resistors R–10 will have a value of 700 ohms and the resistors R–100 a value of 2,000 ohms, a total of 2,760 ohms will be in circuit between terminals TR3, TR4 of the remaining moment accumulator which is proportional to the then remaining moment of 2,760,000 inch pounds.

The gross moment accumulator which had previously been set to positions 4, 5, 4 proportional to a moment of 4,540,000 will have added thereto the station load moment of 380,000 inch pounds making a total gross moment at this time of 4,920,000 inch pounds and the bank A of switches 95, 94 and 93 of the gross moment accumulator 73M is set to positions 4, 9, 2 related to such gross moment in the manner previously described.

Having thus set in the station load weight, the equipment is now ready for the planning operation to determine the distribution of the remaining cargo weight of 8,300 pounds through the various compartments of the aircraft so that when the aircraft is loaded with such additional weight of 8,300 pounds the take-off center of gravity will be as desired, i.e., 240 inches.

Since the station load has its centroid 380 inches from the reference datum, which, referring to Chart I, falls in compartment D, in the illustrative example herein described it is not desired to place any other load in said compartment D.

To this end the compartment D is effectively removed from the computations of the equipment by closing switch 385D (FIG. 13).

As a result, a circuit will be completed from positive main P, through closed switch 385D, lead 383 through the coil 382 of relay 372 to ground. Energization of relay 372 will cause its contact arms 376, 377, 378, 381, 379, 380 to engage the associated fixed contacts 376', 377', 378', 381', 379' and 380'. Closing of contacts 377, 377' and 380, 380' will, through the associated leads 406, 407 short circuit weight resistor RWD1 and moment resistor RMD1 in the adapter for the aircraft being loaded.

The position selector switch 48 shown in FIGS. 4 and 13 is set to compartment B position. As bridge B–1, shown in FIG. 4 is not used at this time, the setting of banks A through E of the position selector switch 48 will have no effect and only the banks F through J are utilized.

At this time the fixed weight resistors RWB1, RWC1, RWE1, RWF1 and RWG1 (FIG. 13) are connected in series between terminals T1W and T2W, for as previously described, resistor RWD1 has been short circuited by the closing of switch 385D. Similarly, referring to FIG. 13, the resistors RMB1, RMC1, RME1, RMF1 and RMG1 are connected in series between terminals T1M and T2M.

Thus, the total value of the resistors between the terminals T1W and T2W is 150 ohms and the resistance between terminals T1M and T2M is 5,740 ohms (see Chart II). The resistance between terminals T1W and T4W is 20 ohms (RWB1) which is picked up through contact B of bank H of the selector switch. Similarly, the resistance between terminals T1M and T4M is 400 ohms (RMB1) which is picked up through contact B of bank F.

The value of resistance in circuit between terminals T1W and T3W is 140 ohms (compartments B, C, E, F) the circuit being drawn from terminal T3W through contacts 376, 376' of relay 375, leads 407, 409, through resistors RWF1, RWE1 across resistor RWD1, which is short circuited, through resistors RWC1 and RWB1 to terminal T1W. Thus, resistance related to the maximum allowable capacity load of all compartments to be loaded except the last compartment is placed in circuit. Similarly, the corresponding moment resistors RMB1, RMC1 and RME1 and RMF1 are in circuit between terminals T1M and T3M for a total value of 4,940 ohms related to the maximum allowable moment.

The value of resistance in circuit between terminals T2W and T4W through contact B of bank H of switch 48 and leads 403, 404, resistors RWC1, RWE1, RWF1 and RWG1 is 130 ohms related to the maximum weight capacity of all of the compartments except the first through which the load is to be distributed, i.e., compartments C, E, F and G. Similarly, the resistance between terminals T2M and T4M will be 5,070 ohms for the corresponding maximum moments for compartments C, E, F and G.

The multiplier B programmer 313 (FIG. 9) is energized by closing its start switch S. As previously described with respect to the multiplier A programmer 217, the stepping switches 307, 308 and 309 are stepped to H or home position and the contact arms of stepping switch 251 to 1 position.

At this time we wish to compare the ratio $$\frac{M\Sigma-F}{W\Sigma-F} \text{ vs } \frac{RM}{RW}$$

where $M\Sigma-F$ = sum of moments of compartments to be loaded less the first compartment $W\Sigma-F$ = sum of weights of compartments to be loaded less the first compartment $RM$ = remaining moment $RW$ = remaining weight As previously described, the resistors $M\Sigma-F$ connected between terminals T2M and T4M have a value of 5,070 ohms and form one arm of bridge B-2. The circuit is from positive main P (FIG. 9) through bank A of stepping switch 251, contact 1, terminal T4M, contact B of bank F of switch 48 (FIG. 13), moment resistors RMC1, RME1, RMF1, RMG1, terminal T2M, contact 1 of bank B of switch 251 (FIG. 9) to junction 297 of bridge B-2. The second arm of the bridge B-2 is from negative main N through contact 1 of bank C of switch 251, terminal T4W, contact B of bank H of switch 48 (FIG. 13), weight resistors RWC1, RWE1, RWF1, RWG1, terminal T2W, lead 278 (FIG. 9) through contact 1 of bank D of switch 251, lead 302 to junction 297. Thus the resistors $W\Sigma-F$ having a value of 130 ohms form the second arm of the bridge B-2. The third arm of the bridge is from positive main P (FIG. 9), terminal TR4 of the remaining moment accumulator 73M', resistors 203 thereof which now have a value of 2,760 ohms proportional to the remaining moment of 2,760,000 inch pounds, terminal TR3, lead 286, contact 1 of bank F of switch 251, lead 303 to junction 299 of bridge B-2. The fourth arm of the bridge is from negative main N, terminal TR4 of the remaining weight accumulator 73W', resistors 203 thereof which now have a value of 83 ohms proportional to a remaining weight of 8,300 pounds, terminal TR3, contact 1 of bank G of switch 251, lead 298 to junction 299 of bridge B-2.

At this time bridge B-2 will be set up as follows:

$$\frac{5070}{130} \text{ vs } \frac{2760}{83}$$

Since $$\frac{M\Sigma-F}{W\Sigma-F}\left(\frac{5070}{130}\right) \text{ is greater than } \frac{RM}{RW}\left(\frac{2760}{83}\right)$$

the bridge B-2 will not be in balance and the output of the phase sensitive amplifier 301 across junctions 297, 299 will pulse the multiplier B programmer 313 to the next step in the cycle, i.e., to move the contact arms of the banks of switch 251 to position 2 to compare:

$$\frac{M\Sigma-L}{W\Sigma-L} \text{ with } \frac{RM}{RW}$$

However, if no amplifier output pulse appears, i.e., if $$\frac{M\Sigma-F}{W\Sigma-F} = < \frac{RM}{RW}$$

switch 251 will remain at postion 1 and relay 431 (FIG. 8A) of the "Omit This Compartment" indicator (FIG. 8), is operated by the programmer at the end of the time sequence to control the "Omit This Compartment" indication lamp 432 which remains illuminated until the position selector switch 48 is turned to the next compartment position.

Since the switch 251 is still at position 1, $$\frac{M\Sigma-F}{W\Sigma-F}$$

is again compared with $$\frac{RM}{RW}$$

with $\Sigma$ representing compartments C, E, F and G and with F representing compartment C and only if $$\frac{M\Sigma-F}{W\Sigma-F}$$

is greater than $$\frac{RM}{RW}$$

will the programmer advance switch 251 to position 2. If equal or smaller, then the "Omit This Compartment" indicator lamp 432 will again go on.

Inasmuch as in the illustrative example $$\frac{M\Sigma-F}{W\Sigma-F} > \frac{RM}{RW}$$

the programmer will advance switch 251 to position 2 to compare $$\frac{M\Sigma-L}{W\Sigma-L}$$

with $$\frac{RM}{RW}$$

with compartments B, C, E and F in circuit.

The circuit for $M\Sigma-L$ is from positive main P (FIG. 9) through contact 2 of bank A of switch 251, leads 255, 256, terminal T1M, the moment resistors RMB1, RMC1, RME1, RMF1 (FIG. 13) which have a value of 4,940 ohms, contacts 379, 379" or relay 375, terminal T3M, lead 269 (FIG. 9) through contact 2 of bank B, lead 296 to junction 297 to form one arm of bridge B-2. The circuit for $W\Sigma-L$ is from negative main N, contact 2 of bank C, leads 275, 276, terminal T1W, the weight resistors RWB1, RWC1, RWE1, RWF1 (FIG. 13) which have a value of 140 ohms, contacts 376, 376" of relay 375, terminal T3W, lead 279, contact 2 of bank D, lead 302 to junction 297 to form a second arm of bridge B-2. The other two arms of the bridge B-2 for RM and RW are the same as previously described as contacts 1 and 2 of banks F and G are connected together.

At this time bridge B-2 will be set up as follows:

$$\frac{4940}{140} \text{ vs } \frac{2760}{83}$$

Since $$\frac{M\Sigma-L}{W\Sigma-L} > \frac{RM}{RW}$$

the bridge B-2 will not be in balance and the output of the phase sensitive amplifier 301 through the multiplier B programmer will cause relay 431 (FIG. 8A) controlling the "Remove Final Compartment" indicator (FIG. 8) to be operated to energize its lamp 432.

In the illustrative example, switch 385G (FIG. 13) is closed energizing relay 375 thus closing its contacts 376, 376'; 377, 377'; 378, 378'; 379, 379' and 380, 380'. Closing of contacts 377, 377' and 380, 380' short circuit resistors RWG1 and RMG1 respectively to eliminate them from the $W\Sigma-L$, $M\Sigma-L$ circuits.

Since the switch 251 controlled by the multiplier B programmer is still at position 2, the new values of $M\Sigma-L$ and $W\Sigma-L$ (RMB1, RMC1 and RME1; RWB1, RWC1 and RWE1) are automatically set in the bridge circuit.

For this comparison:

$$M\Sigma-L = 3,500 \text{ ohms}$$
$$W\Sigma-L = 110 \text{ ohms}$$

RM and RW remaining as before.
The bridge arms are now $$\frac{3500}{110} \text{ vs } \frac{2760}{83}$$

Thus, $$\frac{M\Sigma-L}{W\Sigma-L}$$

has a value of 31.8 which is less than $$\frac{RM}{RW}$$

which has a value of 33 and consequently there is no signal in the output of the amplifier 301. With this condition, at step 2, the multiplier B programmer automatically moves switch 251 to position 3 after a predetermined time and the next comparison in the planning operation is made.

The next step in the operation of the equipment is to determine whether the load of 8,300 pounds to be distributed exceeds the maximum carrying capacity of the four compartments (B, C, E, F) available for loading. To this end, with the switch 251 (FIG. 9) at position 3, the bridge B-2 (FIG. 9) compares $$\frac{RW}{K}$$

to $$\frac{\Sigma W(B, C, E, F)}{K}$$

The circuit is from positive main P through contact 3 of bank A of switch 251 (FIG. 9), lead 258, fixed resistor 259, lead 261, contact 3 of bank B, lead 296 to junction 297 of bridge B-2 to from one arm thereof. The second arm of the bridge B-2 is from negative main N through contact 3 of bank C, leads 275, 276 to terminal T1W, through weight resistors (FIG. 13) RWB1, RWC1, RWE1, RWF1 (RWD1 and RWG1 having been removed from circuit), terminal T2W (FIG. 9), lead 278, contact 3 of bank D, lead 302 to junction 297. The third arm of the bridge is from positive main P, resistor 288, contact 3 of bank F, lead 303 to junction 299 and the fourth arm of the bridge is from negative main N, terminal TR4 of the remaining weight accumulator 73W', resistors 203 thereof, terminal TR3, contact 3 on bank G, lead 298 to junction 299.

The resistors 259 and 288 are identical in value, and the weight resistors RWB1, RWC1, RWE1, RWF1 for compartments B, C, E and F have a value of 140 ohms and the remaining weight accumulator resistors 203 have a value of 83 ohms. Thus, the bridge B-2 will be set up as follows:

$$\frac{83}{K} \text{ vs } \frac{140}{K}$$

and as the bridge is unbalanced, pulses will be delivered to the multiplier B programmer to advance switch 251 to position 4 as the load of 8,300 pounds to be distributed can be accommodated in the four compartments to be loaded.

If there is no output from the amplifier 301, i.e.

$$\frac{RW}{K} > \frac{\Sigma W}{K}$$

the programmer 313 will energize relay 431 (FIG. 8A) of the "Compartments Capacities Exceeded" indicator (FIG. 8), to illuminate lamp 432 thereof. This indicates that the load cannot be distributed in the four compartments selected and the position selector switch 48 is turned to the first or PC position and the reset switch is operated. A new problem is then set into the equipment, i.e., a new cargo load or additional compartments and the operations previously described are repeated.

Assuming that the load can be accommodated and the switch 251 is at position 4, the portion to be distributed into compartment B is determined in the following manner.

To this end, the equipment solves for $\Delta R$ and $\Delta B$ where $$\Delta R = \frac{M\Sigma-F}{W\Sigma-F}RW - RM$$

and $$\Delta B = \frac{M\Sigma-F}{W\Sigma-F}WF - MF$$

At position 4 of the switch 251, $\Delta R$ is determined. The circuit to determine $\Delta R$ is as follows:

From positive main P (FIG. 9) through contact 4 of bank A, terminal T4M, contact B of bank F of switch 48 (FIG. 13), resistors RMC1, RME1, RMF1 (compartment D containing the preload and having been eliminated and compartment G having also been eliminated), terminal T2M, lead 268 (FIG. 9), contact 4 of bank B of switch 251, lead 296 to junction 297. Thus, the moment resistors for compartments C, E and F, having a value of 4,540 ohms, form one arm of bridge B-2. In the second arm of the bridge B-2 are the weight resistors for compartments C, E and F which have a value of 120 ohms connected from negative main N through contact 4 of bank C of switch 251, lead 274, terminals T4W and T2W, lead 278, contact 4 of bank D, lead 302, junction 297. The circuit for the third arm of the bridge B-2 is from negative main N, terminal TR4 of the remaining weight resistors 203 of the remaining weight accumulator which have a value of 83 ohms, terminal TR3, contact 4 of bank G, lead 298 to junction 299 of the bridge and the circuit for the fourth arm of the bridge is from positive main P, terminal TR4 of the remaining moment resistors 203 of the remaining moment accumulator which have a value of 2760 ohms, terminal TR3, lead 285, contact 4 of bank E, lead 304 through the series connected multiplier B, balancing resistors 314, lead 316, terminal 291, contact 4 of bank F, lead 303 to junction 299.

At this time the bridge B-2 will be set up as follows:

$$\frac{M\Sigma-F}{W\Sigma-F} = \frac{RM + \text{Resistors } 314}{RW}$$

or $$\frac{4540}{120} = \frac{2760 + \text{Resistors } 314}{83}$$

where resistors $314 = \Delta R$. Thus, for the bridge B-2 to be in balance, resistors 314 representing $\Delta R$ must have a value of 380 ohms.

This value of 380 ohms is set on the multiplier B resistors 314 in the manner previously described by the pulsing of stepping switches 309, 308 and 307 by the multiplier B programmer 313 and said switches will be set to positions 3—8—0 respectively. Consequently, bank B (FIG. 10) of switches 309, 308, 307 will also be set to positions 3—8—0.

The switch 343 (FIG 10) is closed at position 4 of switch 251 by the programmer 313 after the balancing switches 309, 308 and 307 have been set to position 3—8—0. As a result of the closing of switch 343, a circuit will be completed from positive main P (FIG 10), switch 343, lead 341 through the closed contacts of relays 337, 336 and 335, lead 346, closed contacts 347, 348 of stepping switches 329, 328, 327, through the coils 333 of said switches to ground.

As a result, the stepping switches will be energized and de-energized in conventional manner and the contact arms 331, 332 thereof will advance. When the contact arm 332 of switch 329 reaches contact 3, a circuit will be completed from positive main P, through switch 343, contact arm 311 which is at contact 3, lead 326, contact 3 of bank B of switch 329, contact arm 332, through the coil 334 of relay 337 to ground. Relay 337 will quickly open, breaking the circuit to stepping switch 329 which will thus remain at contact 3. Similarly, switches 328 and 327 will be set to contacts 8 and 0, so that 380 ohms of resistors 330 will be in circuit between terminals TR5 and TR6. Thus, at position 4 the value of ΔR, i.e., 380 ohms, will be determined, and resistor bank 330 of the ΔR storage register 263 will be set to this value. The programmer 313 then advances switch 251 to position 5 (FIG. 9).

In this position the value of ΔB is determined in the same manner as ΔR was determined. Two arms of the bridge B–2 are the same as previously described, i.e., the moment resistors $M\Sigma-F$ have a value of 4,540 ohms and the weight resistors $W\Sigma-F$ have a value of 120 ohms. The circuit for the third arm of the bridge B–2 is from negative main N, contact 5 of bank C of switch 251, terminal T4W, lead 274, contact B of bank H of switch 48 (FIG. 13), leads 403, 404, resistor RWB1, which has a value of 20 ohms, terminal T1W, leads 276, 277, contact 5 of bank G (FIG. 9), lead 298 to junction 299. The circuit for the fourth arm of bridge B–2 is from positive main P, contact 5 of a bank A, lead 254, terminal T4M, contact B of bank F of switch 48 (FIG. 13), resistor RMB1 which has a value of 400 ohms, terminal T1M, leads 256, 257 (FIG. 9), contact 5 of bank E, lead 304, through the series connected multiplier B balancing resistors 314, lead 316, terminal 291, contact 5 of bank F, lead 303 to junction 299. At this time the bridge B–2 will be set up as follows:

$$\frac{M\Sigma-F}{W\Sigma-F}=\frac{MF+\text{Resistors 314}}{WF}$$

or $$\frac{4540}{120}=\frac{400+\text{Resistors 314}}{20}$$

where resistors $314=\Delta B$. Thus, for bridge B–2 to be in balance, resistors 314 representing ΔR must have a value of 357 ohms. This value of 357 ohms is set on the multiplier B resistors 314 in the manner previously described and the switches 309, 308 and 307 will be set to position 3—5—7 respectively.

In the manner described with respect to the ΔR storage register 262 (FIG. 10), the ΔB storage register 282 (FIG. 11) will be set to positions 3, 5, 7.

The switch 251 is then advanced by the multiplier B programmer 313 to position 6. In this position the values of ΔR and ΔB are compared for if ΔR is greater than ΔB, i.e., $$\frac{\Delta R}{\Delta B}>1$$

the load planned for compartment B will exceed the maximum capacity of such compartment. If ΔR does exceed ΔB then the equipment will indicate the maximum capacity of such compartment B, i.e., 2,000 pounds, as the load to be carried. If it is less than 1 it will indicate the exact load to be carried.

The circuit for comparing ΔR and ΔB is as follows with the switch 251 at position 6:

From positive main P (FIG. 9) through contact 6 of bank A of switch 251, terminal TR5 of the ΔR storage register, resistors 330 thereof which have a value of 380 ohms, terminal TR6, lead 264, contact 6 of bank B, lead 296 to junction 297 of bridge B–2 to form one arm of the bridge. The second arm of the bridge is from negative main N, terminal TR5 of the ΔB storage register, resistors 330 thereof which have a value of 357 ohms, terminal TR6, lead 281, contact 6 of bank D, lead 302 to junction 297. The third and fourth arms of the bridge B–2 are connected from positive main P, through the resistor 293, contact 6 of bank F, lead 303 to junction 299 and from negative main N, resistor 295, contact 6 of bank G, lead 298 to junction 299, the resistors 293 and 295 being equal in value. Since ΔR (380) is greater than ΔB (357) again the switch 251 will be advanced by the programmer 313 to position 8. In this position the load to be placed in compartment B is now computed.

Referring to FIG. 9, one arm of the bridge B–2 will be from positive main P, contact 8 of bank A, resistor 265, lead 266, contact 8 of bank B, lead 296 to junction 297. The second arm of the bridge B–2 is from negative main N, resistor 284, contact 8 of bank D, lead 302 to junction 297, the resistors 365 and 284 being of equal value. The third arm of the bridge is from negative main N through contact 8 of bank C, lead 274, terminal T4W, contact B of bank H of switch 48 (FIG. 13), leads 403, 404, resistor RWB1 which has a value of 20 ohms, terminal T1W, leads 276, 277, contact 8 of bank G (FIG.9), lead 298 to junction 299 of the bridge B–2. The fourth arm of the bridge is from positive main P, contact 8 of bank E, lead 304, through the series connected multiplier B, balancing resistors 314, lead 316, terminal 291, contact 8 of bank F, lead 303 to junction 299. The bridge will be balanced in the manner previously described so that the multiplier B resistors will be set to 0—2—0 related to 2,000 pounds, the maximum weight allowable for compartment B. At step 8, the switch 358 (FIG. 12) is closed and as the bank D of switches 309, 308 and 307 are set to position 0—2—0, a circuit will be completed to the associated indicator lamps 355 which will indicate 0—2—0 or 2,000 pounds as the weight to be loaded in compartment B.

This weight is now set into the equipment to simulate the load for compartment B. To this end the weight register switches 22, 23, 24 (FIG. 2) are set to 0—2—0 position representing 2,000 pounds. The add switches 154 of the gross weight, gross moment, remaining weight and remaining moment programmer and accumulator are closed and the multiplier A programmer start switch S is closed to energize the multiplier A programmer 217.

At this time, referring to FIG. 4, bridge B–1 will have in one arm the weight register resistances 35 of 20 ohms (related to 2,000 pounds) connected through contact B of bank A of switch 48 to junction 79 of bridge B–1. In the second arm, bridge B–1 will have fixed resistor 72 of 100 ohms connected to junction 79. In the third arm connected to junction 81 of bridge B–1, there will be a fixed resistor RB1 in the adaptor 75 which is of a value proportional to the centroid of compartment B, i.e., since the centroid of compartment B is 200 inches from the reference datum, resistor RB1 has a value of 200 ohms. As the bank F (FIG. 5) balancing resistors 225 of multiplier A form the fourth arm of the bridge B–1, for the bridge to be in balance the balancing resistors 225 must have a total value of 40 ohms. Consequently, the banks A–F of switches 212, 213 and 214 will be stepped to positions 0—4—0, in the manner previously described, representing a cargo moment of 400,000 inch pounds for cargo simulated for compartment B.

In the manner previously described, the gross weight accumulator switches 95, 94, 93 (FIG. 6) which had been previously set to positions 2—3—7, representing a weight of 23,700 pounds (primary weight of 22,700 pounds plus 1,000 pounds station load) is now set to positions 2—5—7, representing a weight of 25,700 pounds, i..e, the primary weight, the station load weight and the weight simulated for the compartment B, placing 257 ohms in circuit. Similarly, as previously described, the remaining weight accumulator switches 95, 94, 93 (FIG. 7) which had been set to positions 9—1—6 to place in circuit 83 ohms representing a remaining weight of 8,300 pounds is now set to positions 9—3—6, placing 63 ohms in the circuit for a remaining weight of 6,300 pounds.

The switches 95, 94, 93 of the gross moment accumulator (similar to FIG. 6) which had previously been set to positions 4-9-2 representing a gross moment of 4,920,-000 inch pounds is now set to positions 5-3-2 representing a gross moment of 5,320,000 inch pounds. The switches 95, 94, 93 of the remaining moment accumulator (similar to FIG. 7) which had previously been set to positions 7-2-3 representing a remaining moment of 2,760,000 inch pounds is set to positions 7-6-3 representing a remaining moment of 2,360,000 inch pounds.

The equipment is now ready to determine the distribution of the remaining cargo load of 6,300 pounds, i.e., 9,300 pounds minus 1,000 pounds station load, minus 2,000 pounds compartment B load into the remaining compartments C, E and F.

The position selector switch 48 is now turned to the next compartment position in the illustrative example, i.e., compartment C.

The multiplier B programmer 313 (FIG. 9) is energized by closing its manual start switch S and the operations previously described are repeated to determine the load for compartment C.

With the particular illustrative problem herein given, the operations of the equipment at positions 1 through 6 of switch 251 are similar to those previously described and the values of ΔR and ΔB will be found to be 376 and 671 respectively (compartments D and G have been eliminated and compartment B has been loaded so only compartments E and F remain for $W\Sigma - F$ and $M\Sigma - F$). In this situation it is apparent that the ratio $$\frac{\Delta R}{\Delta B}$$

is less than 1 and the programmer 313 will advance switch 251 to position 7 to perform the following computation.

At this time the circuit for one arm of bridge B-2 (FIG. 9) will be from positive main P, contact 7 of bank A of switch 251, terminal TR5 of the ΔR storage register, the resistors 330 of which have a value of 376 ohms, terminal TR6, contact 7 of bank B to junction 297 of the bridge. The second arm of bridge B-2 is from negative main N, terminal TR5 of the ΔB storage register, the resistors 330, which have a value of 671 ohms, terminal TR6, contact 7 of bank D to junction 297 of the bridge.

For the third arm of the bridge B-2 the circuit is from negative main N, contact 7 of bank C, terminals T4W, T1W of the adaptor representing resistor RWC1 which has a vaue of 50 ohms for maximum capacity of compartment C of 5,000 pounds, contact 7 of bank G to junction 299. In the fourth arm of the bridge the circuit is from positive main P through contact 7 of bank E, through the multiplier B, balancing resistors 314, contact 7 of bank F to junction 299.

For the bridge B-2 to be in balance the balancing resistors 314 (FIG. 9) must have a value of 28 ohms representing a weight of 2,800 pounds, and the switches 309, 308 and 307 will be set to positions 0-2-8, in the manner previously described. Similarly, as previously described, the banks B (FIG. 10), C (FIG. 11) and D (FIG. 12) will set to positions 0—2—8. Thus, the lamps 355 controlled by the load director bank D will show 2,800 pounds as a load for compartment C.

This weight is simulated on the weight register (FIG. 2) as previously described for compartment B and the operations are then repeated.

After this operation the gross weight accumulator will be set to represent a value of 28,500 pounds (25,700+2,-800). The remaining weight accumulator will be set to represent a value of 3,500 pounds (6,300—2,800). The gross moment accumulator will be set to represent a value of 6,160,000 inch pounds (5,320,000+2,800×300) and the remaining moment accumulator will be set to represent a value of 1,520,000 inch pounds (2,360,-000—840,000).

Inasmuch as compartment D is not to be loaded because of the preload, and the switch 385D is already closed, the position selector switch 48 is turned to the next compartment, i.e., compartment E position, and the equipment will determine in the manner previously described, that 2,000 pounds is to be loaded into compartment E and the gross weight, remaining weight, gross moment and remaining moment accumulators will be set to positions representing gross weight, 30,500 pounds (28,500+2,000), remaining weight 1,500 pounds (3,-500—2,000), gross moment, 6,960,000 inch pounds (6,-160,000+2,000×400) and remaining moment, 720,-000 inch pounds (1,520,000—800,000).

The position selector switch is turned to compartment F, which, in this case, is the last compartment of the sequence to be loaded.

When the selector switch 48 was at position C, referring to FIG. 13, a circuit was completed from the positive main P, lead 387, contact C of bank J of switch 48, leads 388, 383 through the coil 382 of relay 370 to ground. As a result, relay 370 will be energized. Closing of its contacts 377, 377'; 380, 380' will short circuit resistor RWB1, RMB1 to take them out of the circuit as desired. This operation also occurs at subsequent contacts as the selector switch 48 is turned, the relays 372 and 375 associated with compartments D and G having already been energized by the closing of switches 385D and G. The diodes 391 and 392 provide for current flow toward the associated relays so that as the contacts C to E are engaged when switch 48 is turned, the associated prior relays will remain energized.

When the selector switch is at position F, in the illustrative embodiment, the final compartment in the sequence, all the relays 370–375 will have been energized. As a result, there will be a circuit from positive main P, closed contacts 378, 378' of relays 370 through 375 and through the coil of relay 417 to ground. As a result, relay 417 will be energized and its contacts 421, 422 will close so that the last compartment lamp 423 will be illuminated.

When relay 417 (FIG. 13), the final compartment relay is energized, a circuit will be completed from positive main P, through the closed contacts 421, 422 to terminal 441 and thence to terminal 442 of bank C of the remaining weight accumulator (FIG. 7), lead 443 through the contact arms 98 to contacts 9, 8, 4 of switches 95, 94, 93 representing a remaining weight of 1,500 pounds.

The contacts H and 1 to 9 of bank C (FIG. 7) of the switches 95, 94, 93 are connected respectively to the contacts 9 to 0 of bank D (FIG. 12). Hence, when relay 417 is actuated the lamps 355 of the load director 362 connected to contacts 0—1—5 of bank D (FIG. 12), which correspond to contacts 9—8—4 of the remaining weight accumulator (FIG. 7), will be energized to indicate such remaining weight of 1,500 pounds as the weight to be loaded into the last compartment, i.e., compartment F.

It is apparent that the equipment will always indicate, for the last compartment of the sequence to be loaded, the then remaining weight and if the exact load directions given by the equipment have been followed and the value of $$\frac{\Delta R}{\Delta B}$$

for the next to last compartment is less than one, then the remaining weight thus indicated for the last compartment will provide for the fully loaded aircraft a take-off center of gravity which is exactly equal to the desired take-off center of gravity.

If the load for the next to the last compartment has been limited due to its weight capacity, i.e., if $$\frac{\Delta R}{\Delta B} > 1$$

it is probable that the remaining weight to be loaded into the last compartment will not give a final center of gravity that is exactly the desired final center of gravity. However, such indicated final center of gravity will deviate only slightly from the desired final center of gravity. This result is the best that can be achieved for loading with a particular weight of load and compartments available and with the desired take-off center of gravity set into the equipment.

In the illustrative embodiment shown, since the remaining weight was 1,500 pounds, the load director lamps 355 (FIG. 12) will indicate such value. This value is simulated on the weight register (FIG. 2) and as previously described, the add switch of all of the programmers and accumulators and the manual start button S of multiplier A programmer are closed. Consequently, in the manner previously described, the accumulators will become set to positions representing the following values.

Gross weight accumulator ____ 32,000 pounds
                                (30,500+1,500)
Remaining weight accumulator _ "0" (1,500—1,500)
Gross moment accumulator ____ 7,680,000 pounds
                                (6,960,000+1,500×480)
Remaining moment accumulator _____ "0" (720,000—1,500×480)

Since the remaining weight and remaining moment are both "0," the desired condition should have been satisfied. This can be checked by a calculation of the center of gravity of the aircraft as planned for loading and such center of gravity should equal the desired center of gravity in inches, originally set into the equipment, when the position selector switch 48 was at the desired condition (DC) setting.

Referring to FIG. 4, the position selector switch 48 is turned to the GC or gross condition position. The circuit for determining center of gravity is from positive main P through the gross moment accumulator resistors 203 which have a value of 7,680 ohms proportional to a gross moment of 7,680,000 inch pounds, contact GC of bank B, lead 77 to junction 79 of bridge B–1 to form one arm of said bridge. The circuit for the second arm of the bridge is from negative main N, contact GC of bank D, terminal TR4, gross weight accumulator resistors 203 which have a value of 320 ohms, proportional to a gross weight of 32,000 pounds, terminal TR3, contact GC of bank C, lead 78 to junction 79. The circuit for the third arm of the bridge is from negative main N through fixed resistor 68 which has a value of 10 ohms, through contact GC of bank E, lead 82 to junction 81. The circuit for the fourth arm of the bridge B–1 is from positive main P, lead 232 through the balancing resistors 225 of the multiplier A programmer (FIG. 5), leads 228 and 83 to junction 81. For the bridge to be balanced, resistors 225 will have to be set to a value of 240 ohms equal to the center of gravity of the aircraft of 240 inches as thus planned which is exactly equal to the original desired center of gravity of the aircraft.

The bridge B–1 will be balanced in the manner previously described and the stepping switches 214, 213, 212 will advance to contacts 2—4—0. Thus, the bank F will be set so that resistors 225 have 240 ohms in circuit to balance the bridge and the contact arms 215 of bank A will be set to contacts 2—4—0.

When the switch 48 was set to GC position, a circuit was provided from positive main P, contact arm 51 of bank A, (FIG. 4) contact GC engaged thereby, terminal 76, lead 219 (FIG. 5) to the contact arms 215 of bank A of switches 214, 213 and 212, engaging contacts 2—4—0 and through the center of gravity indicator lamps 218 to ground. Thus, the lamps corresponding to 2—4—0 will be illuminated to indicate the center of gravity of 240 inches.

At the same time when switch 48 is at the GC position, the gross weight of the aircraft as planned for loading is indicated.

Referring to FIG. 6, the contact arms 98 of bank C of switches 95, 94, 93 of the gross weight accumulator have been set to contacts 3—2—0 related to the gross weight of 32,000 pounds. When the switch 48 is at the GC position, a circuit is completed from positive main P (FIG. 4), terminal 76, lead 446 (FIG. 6) connected thereto, to the contact arms 98 of bank C of switches 95, 94, 93 which are engaging contacts 3—2—0. As the contacts H, 1–9 of bank C of switches 95, 94, 93 are connected respectively to the contacts 0, 1–9 of bank D (FIG. 12), the lamps 355 of the load director 302 connected to contacts 3—2—0, will be energized indicate such gross weight of 32,000 pounds.

The equipment in addition to planning the distribution of a given cargo load also may be used to determine the effect on the weight and center of gravity of the aircraft if a portion of the cargo load is removed during flight by air-drop, or on the ground, or to determine the effect of fuel consumption on the center of gravity of the aircraft.

To this end, the equipment is set to preload position. It is to be noted that the equipment is not reset, for the load as previously planned must remain in the various accumulators in order that the load removals or fuel consumption can be computed.

With the position selector switch 48 in the preload position, the arm register 41 (FIG. 3) is set to a position related to the centroid of the weight being removed, be it cargo or fuel which illustratively is 380 inches. The weight register 21 (FIG. 2) is then set to a position corresponding to the weight of such cargo or fuel to be removed, illustratively 1,000 pounds. Thus, the arm register switches 24, 23, 22 are set to 3—8—0 and the weight register switches 24, 23, 22 are set to 0—1—0.

Thereupon, the subtract switches 155 (FIG. 6) are closed and the manual start button S of the multiplier A programmer 217 (FIG. 5) is closed.

The bridge B–1 will determine the moment of such load of 1,000 pounds in the manner previously described with respect to the preload position. Consequently, the balancing resistors 225 of the multiplier A programmer will become set to a value of 38 ohms proportional to a moment of 380,000 inch pounds.

Referring to the weight register 21 (FIG. 2) which is set to position 0—1—0 for a weight of 1,000 pounds, since the subtract switch 155 (FIG. 6) of the gross weight accumulator is closed and since the banks of the stepping switches 95, 94, 93 are set to 3—2—0 representing a weight of 32,000 pounds, it is apparent that for the weight accumulator to indicate the value of the new gross weight, i.e., 31,000 pounds, switch 94 must be set to position 1 rather than position 2 so that the weight resistors 203 of bank A having a value of 310 ohms will be placed in circuit between terminals TR3 and TR4.

In the manner previously described, since the hundreds and units switches 24, 22 of the weight register 21 are set to position "0," nine pulses will be delivered to the stepping switches 95 and 93 (FIG. 6) to advance the contact arms 96 from position 3 (switch 95) and from position H or "0" (switch 93), to positions 1 and 9. In addition to such 9 pulses as previously described, the stepping switch 93 will have received an additional pulse when contact arm 92 of bank B was at position 1 as switch 162 is closed at this time and a further additional pulse when contacts 92 of bank B was at position 11, due to closing of contacts 119, 119' of relay 115 when the latter is energized by the movement of contact arm 97 of bank B of switch 93 to contact 10. This relay remains energized through contacts 121 and 121' until switch 91 returns to H position at the end of the cycle at which time cam operated contacts 112 and 113 of switch 91 will open to break the circuit to the relay coil. Consequently, 11 pulses will have been delivered to switch 93 so that its contact arm 96 will be moved around to position H or "0." Similarly, referring to switch 95 which originally was at position 3, it had received 9 pulses to move its contact arm 96 to position 1. Switch 95 receives two additional pulses when contact arm 92 of bank D of switch 91 is at position 12 and 13 due to the energization of relays 116 and 117 from position 10 of bank B of switches 94 and 95 so that contact arm 96 of switch 95 is moved back to position 3.

The contact arm 96 of switch 94 which originally was at position 2 receives but 8 pulses due to the setting of switch 23 of the weight register. This will advance contact arm 96 from position 2 to position 10. In addition, the switch 94 receives two more pulses when contact arm 92 of bank C engages contacts 11 and 12 thereof due to the energization of relays 115 and 116 which advances the contact arm 96 of switch 94 to position 1.

Consequently, the gross weight accumulator is now set to positions 3—1—0 (hundreds, tens, units) corresponding to the new gross weight of 31,000 pounds. In a similar manner, the gross moment accumulator is set from positions 7—6—8 (hundreds, tens, units) corresponding to a gross moment of 7,680,000 pounds, to positions 7—3—0 corresponding to a gross moment of 7,300,000 inch pounds.

The position selector switch is now turned to the gross condition or GC position and as previously set forth, the new center of gravity is determined, based upon such new gross moment and gross weight and this center of gravity is found to be 235 inches.

To determine the effect of removing any compartment load it is merely necessary to turn to a compartment position and simulate the weight on the weight register 21 to be removed from such compartment and by pressing the start switch to perform the operations previously described. The centroid used in such balance for the moment computation is obtained from the aircraft adaptor 75 through the aircraft type selector switch. This centroid replaces the arm register used in the previous calculation. The position selector switch is thereupon turned to the gross condition or GC position to determine the new gross weight and center of gravity position.

The equipment above described can be used as shown in FIG. 14 in conjunction with center of gravity computing equipment CG of the type shown and described in Patent No. 2,686,426, dated August 17, 1954.

Thus, after the initial values of the aircraft type are set into the combined equipment CG and P, an aircraft would be positioned on the weighing scales S of the center of gravity equipment CG.

The center of gravity equipment CG computes the weight and center of gravity of the aircraft before loading, i.e., the primary condition of the aircraft, in the manner described in said patent and this information is transmitted to the planner equipment P for use in the load distribution planning.

Thereupon the aircraft could be removed from the scales S and the planning equipment P would function in the manner above set forth.

After the load planning had been accomplished and the aircraft loaded according to such plan, the actual center of gravity position and gross weight could be checked by again positioning the aircraft on the weighing scales S of the center of gravity equipment CG.

It is to be noted that if during the planning operation, it is desired to deviate from the load indicated for the compartment, this can be done, for the equipment thereafter automatically recomputes the distribution of the remaining cargo weight.

In the illustrative example the ratio of $$\frac{RM}{RW}$$

was compared with the ratio $$\frac{M\Sigma-F}{W\Sigma-F}$$

and $$\frac{M\Sigma-L}{W\Sigma-L}$$

for the purpose of selecting a sequence of regions to be loaded such that all of such regions do not differ materially from proportional loading. However it is within the scope of the invention to compare $$\frac{RM}{RW}$$

with $$\frac{M\Sigma\pm\Delta}{W\Sigma\pm\Delta}$$

where $\Delta$ can be any desired value.

As many changes could be made in the above equipment and system, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. Equipment for determining the distribution of a cargo weight into regions of an aircraft for desired center of gravity position of the loaded aircraft, said equipment comprising an adjustable unit, means to set said unit to a position related to the cargo weight remaining to be loaded into the aircraft, a second adjustable unit, means to set said unit to a position related to the moment of such remaining cargo weight which is the difference between any desired moment of the aircraft after it is loaded with the entire weight to be carried and the actual moment of the aircraft before loading the remaining weight, means to set said first and second adjustable units comprising an adjustable means adapted to be set to positions related to weight, a second adjustable means adapted to be set to positions related to arms, means to determine the product of the values of said two adjustable means, a first and second additional adjustable means, each adapted to be set to such product, said second additional adjustable means comprising the second adjustable unit, a third additional adjustable means adapted to be set to the value of the first adjustable means, whereby when said first and second adjustable means are set to the primary weight and primary center of gravity position of the aircraft, each of the two additional adjustable means will be set to the primary moment and the third additional adjustable means will be set to the primary weight, means thereafter to connect in series the first adjustable means and the third additional adjustable means and to actuate said product determining means to determine the product of the series connected adjustable means and the second adjustable means, whereby when said first and second adjustable means are set to the cargo weight and the desired center of gravity, the product determining means will determine the desired gross moment of the aircraft, means to thereupon set the second additional adjustable means to the difference between the gross moment and primary moment or the cargo moment, a fourth additional adjustable means comprising the first adjustable unit, means to set said fourth additional adjustable means to the cargo weight or the remaining weight, a plurality of units of predetermined value related to the centroid of each of the regions of the aircraft, means to actuate said product determining means to determine the product of the first adjustable means and successive units of said plurality or the moment of the weight to be loaded into the regions associated with each of said units, and means to set said second additional adjustable unit to the difference between the value of its setting and the present value of said product determining means and to set said forth additional adjustable means to the difference between the value of its present setting and the setting of the first adjustable means, a plurality of units of predetermined values related to a given weight and corresponding moment for each of a sequence of regions of the aircraft, and means controlled conjointly by the settings of said two adjustable units and the settings of said plurality of units for determining the portion of the cargo weight to be loaded into the first region of such sequence.

2. The combination set forth in claim 1 in which means are provided controlled by the setting of the third additional adjustable means to indicate the gross weight of the aircraft.

3. The combination set forth in claim 1 in which means are provided controlled by the fourth additional adjustable means to indicate the remaining cargo weight, and means to actuate said indicating means when the last compartment in the sequence is to be loaded.

4. The combination set forth in claim 1 in which means are provided to determine the center of gravity position of the aircraft, said means comprising a bridge circuit having in one arm the first additional adjustable unit which is of value related to moment of the aircraft thus far planned for loading, having in a second arm the third additional adjustable unit which is of value related to the corresponding weight and having an adjustable unit in a third arm, and means controlled by unbalance of said bridge to set the adjustable unit in the third arm to a position proportional to the quotient of the value of the unit in the first arm divided by the value of the unit in the second arm, an indicator, and means controlled by the setting of the adjustable unit in the third arm of the bridge to set said indicator.

5. Equipment for determining the distribution of a cargo weight into regions of an aircraft for desired center of gravity position of the loaded aircraft, said equipment comprising an adjustable unit, means to set said unit to a position related to the cargo weight remaining to be loaded into the aircraft, a second adjustable unit, means to set said unit to a position related to the moment of such remaining cargo weight which is the difference between any desired moment of the aircraft after it is loaded with the entire weight to be carried and the actual moment of the aircraft before loading the remaining weight, a plurality of units of predetermined values related to a given weight and corresponding moment for each of a sequence of regions of the aircraft, and means controlled conjointly by the settings of said two adjustable units and the settings of said plurality of units for determining the portion of the cargo weight to be loaded into the first region of such sequence, the plurality of units comprising a group of units related to a given weight for each region, a second group of units related to the corresponding moment, and said conjointly controlled means comprises means to determine the quotient of the value of the second group of units less the first unit divided by the first group of units less the first unit, means to determine the product of the value of the first adjustable unit and said quotient, means to determine the difference between said product of the value, and the value of the second adjustable unit, an additional adjustable unit set to such difference, means to determine the product of the value of the first unit of the first group of units and said quotient, means to determine the difference between said second product and the value of the first unit of the second group, a second additional adjustable unit set to said second difference, means to determine the product of the first unit of said first group and the quotient of the values of the first additional unit divided by the second additional unit, an indicator and means controlled by said product determining means to set said indicator to a position related to such product.

6. The combination set forth in claim 5 in which means are provided to compare the value of the first additional adjustable unit with the value of the second additional adjustable unit, and means when said first additional adjustable unit exceeds the value of said second additional adjustable unit to set said indicator to a value related to the value of the first unit of said first group of units.

7. The combination set forth in claim 5 in which means are provided controlled by the settings of said adjustable units and said plurality of units for comparing the values of said second adjustable unit divided by the value of said first adjustable unit to the quotient of the sum of the moments of such sequence less the first region divided by the sum of the associated weights, means when said first quotient is no greater than said second quotient to thereupon effect the comparison by said comparing means of the first quotient to the quotient of the sum of the moments of the sequence of regions less the last region, to the sum of the associated weights, and means controlled by said quotient comparing means when said first quotient is no less than said third quotient to determine said product.

8. The combination set forth in claim 5 in which means are provided to connect the units related to the weights in each region in series and to compare the value of said series connected units with the value of said first adjustable unit, a warning indicator and means when the value of said first adjustable unit exceeds the value of said series connected units to actuate said warning indicator.

9. Equipment for determining the distribution of a cargo weight into an aircraft for desired center of gravity position of the loaded aircraft, said equipment comprising an adjustable unit, means to set said unit to a position related to the remaining cargo weight to be loaded into the aircraft, a second adjustable unit, means to set said unit to a position related to the desired moment of such remaining cargo weight, a plurality of units of predetermined values related to a given weight and corresponding moment for each of a sequence of regions of the aircraft, said plurality of units includes a group of units related to given weights for the respective regions of such sequence, a second group of units each related to given moments corresponding to the respective given weights, means to provide a multiplicity of circuits related to a plurality of various possible groups of regions of such sequence, among which the cargo load might be distributed, said circuits including units of said plurality, means controlled by the settings of said two adjustable units for determining the selection of one of said multiplicity of circuits, a load director having and indicator, and means controlled conjointly by the first adjustable unit and the units of said plurality included in the selected circuit for establishing a setting of said indicator which corresponds to said remaining cargo weight multiplied by a factor related to the number of regions in the selected group of regions, said last named means comprising circuits for determining the product $$WF\frac{\Delta R}{\Delta B}$$

where $WF$ = given value for first unit of first plurality of units $$\Delta R = \frac{\Sigma M - F}{\Sigma W - F} RW - RM$$

$$\Delta B = \frac{\Sigma M - F}{\Sigma W - F} WF - MF \text{ and}$$

$RW$ = value of first adjustable unit $$\frac{\Sigma M - F}{\Sigma W - F} = \frac{\text{sum of values of second group of units less the first unit of the group}}{\text{sum of values of first group of units less the first unit of the group}}$$

$RM$ = value of second adjustable unit
$MF$ = given value for first unit of second plurality of units.

10. Equipment for determining the distribution of a cargo weight into a sequence of regions of an aircraft for desired center of gravity position of the loaded aircraft, said equipment comprising an adjustable unit, means for setting said unit to a value related to the remaining weight of cargo to be loaded into the aircraft, a second adjustable unit, means to set said second unit to a value related to the desired remaining moment corresponding to such remaining weight, a plurality of units of predetermined values related to given weights for the respective regions, a second plurality of units of predetermined values related respectively to the moments corresponding to such given weights, an indicator, means for determining the sum of the moments of such sequence of regions less the first region and the sum of the weights of such sequence of regions less the first region, means for determining the quotient of such sums, means for comparing the values of the quotient of remaining moment divided by remaining weight to said first quotient and means controlled by said quotient comparing means, when said first quotient is no greater than said second quotient for setting said indicator to a position which corresponds to the value of the given weight for the region to be loaded multiplied by a factor related to the number of regions in the sequence.

11. The combination set forth in claim 10 in which means controlled by said quotient determining means actuates a warning indicator when said first quotient predominates over said second quotient.

12. The combination set forth in claim 10 in which said comparing means comprises a bridge circuit, said first and second adjustable units are in two arms of said bridge and said two plurality of units are in two other arms of said bridge, and means controlled by unbalance of said bridge when said first quotient predominates over said second quotient actuates a switch to actuate a warning indicator.

13. The combination set forth in claim 10 in which a plurality of switch means corresponding to each of such regions controls said two plurality of units, said switch means being arranged to bypass, when actuated, those of said two plurality of units related to the region having an associated actuated switch.

14. Equipment for determining the distribution of a cargo weight into a sequence of regions of an aircraft for desired center of gravity position of the loaded aircraft, said equipment comprising an adjustable unit, means for setting said unit to a value related to the remaining weight of cargo to be loaded into the aircraft, a second adjustable unit, means to set said second unit to a value related to the desired remaining moment corresponding to such remaining weight, a plurality of units of predetermined value related to given weights for the respective regions, a second plurality of units of predetermined value related respectively to the moments corresponding to such given weights, means for determining the sum of the moments of such sequence of regions less the first region and the sum of the weights of such sequence of regions less the first region, means for determining the quotient of such sums, means for comparing the values of remaining moment divided by remaining weight to said first quotient means for determining the sum of the moments of such sequence of regions less the last region and the sum of the weights of such sequence of regions less the last region, means for determining the quotient of such sums, means when said first quotient is no greater than said second quotient, to thereupon effect the comparison by said comparing means of the first quotient to said third quotient, an indicator and means controlled by said quotient comparing means, when said first quotient is no less than said third quotient, for setting said indicator to a position which corresponds to the value of the given weight for the region to be loaded multiplied by a factor related to the number of regions in the sequence.

15. Equipment for determining the distribution of a cargo weight into a sequence of regions of an aircraft for desired center of gravity position of the loaded aircraft, said equipment comprising an adjustable unit, means for setting said unit to a value related to the remaining weight of cargo to be loaded into the aircraft, a second adjustable unit, means to set said second unit to a value related to the desired remaining moment corresponding to such remaining weight, a plurality of units of predetermined values related to given weights for the respective regions, a second plurality of units of predetermined values respectively to the moments corresponding to such given weights, means for determining the sum of the moments of such sequence of regions less the first region and the sum of the weights of such sequence of regions less the first region, means for determining the quotient of such sums, means for comparing the values of remaining moment divided by remaining weight to said first quotient means for determining the sum of the moments of such sequence of regions less the last region and the sum of the weights of such sequence of regions less the last region, means for determining the quotient of such sums, means when said first quotient is no greater than said second quotient to thereupon effect the comparison by said comparing means of the first quotient to said third quotient, an indicator and means controlled by said quotient comparing means, when said first quotient is no less than said third quotient, for setting said indicator to a position related to the value of the weight to be loaded into the first region of the sequence, such value being such that the ratio of the difference between the remaining moment determined by the setting of the second adjustable unit and the moment of such weight value for the associated region, to the difference between the remaining weight determined by the setting of the first adjustable unit and such weight value, is equal to the ratio of the sum of the given moments of all of the regions remaining of the sequence less the region associated with such weight value determined by the settings of the associated units of said plurality, to the sum of the given weights of all such regions less the region associated with such weight value determined by the settings of the associated units of said plurality.

16. The combination set forth in claim 15 in which means controlled by said quotient determining means actuates a warning indicator when said first quotient is less than the third quotient.

(References on following page)

References Cited in the file of this patent

UNITED STATES PATENTS

| | | |
|---|---|---|
| 2,443,098 | Dean | June 8, 1948 |
| 2,657,857 | Carreyette | Nov. 3, 1953 |
| 2,686,634 | Kolisch | Aug. 7, 1954 |
| 2,725,193 | Kolisch | Nov. 29, 1955 |

OTHER REFERENCES

"Balance Loading of Large Cargo Transports" (Wheatcroft), Air Transport, October 1943. (Pages 58–59 relied on.)